US 12,495,626 B2

(12) United States Patent
Lee

(10) Patent No.: US 12,495,626 B2
(45) Date of Patent: Dec. 9, 2025

(54) IMAGE SENSOR AND METHOD FOR MANUFACTURING THE SAME

(71) Applicant: Samsung Electronics Co., Ltd., Suwon-si (KR)

(72) Inventor: Won Seok Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 487 days.

(21) Appl. No.: 17/879,521

(22) Filed: Aug. 2, 2022

(65) Prior Publication Data

US 2023/0197740 A1 Jun. 22, 2023

(30) Foreign Application Priority Data

Dec. 20, 2021 (KR) .................. 10-2021-0182305

(51) Int. Cl.
$H10F\ 39/00$ (2025.01)

(52) U.S. Cl.
CPC ......... $H10F\ 39/802$ (2025.01); $H10F\ 39/024$ (2025.01); $H10F\ 39/8063$ (2025.01); $H10F\ 39/811$ (2025.01)

(58) Field of Classification Search
CPC .... H10F 39/802; H10F 77/206; H10F 10/161; H10F 19/75; H10F 39/8063; H10F 39/024; H10F 39/1865; H10F 39/811; H10D 62/117; H10D 62/152; H10D 64/018; H10D 89/921; H10D 30/611; A61K 40/4225; A23B 70/20; H01L 27/14603;

(Continued)

(56) References Cited

U.S. PATENT DOCUMENTS

| 8,217,484 B2 | 7/2012 | Park |
| 8,576,318 B2 | 11/2013 | Lee et al. |

(Continued)

FOREIGN PATENT DOCUMENTS

| KR | 10-2016-0000044 A | 1/2016 |
| KR | 10-2017-0068310 A | 6/2017 |

(Continued)

OTHER PUBLICATIONS

European Search Report dated Apr. 12, 2023, issued in corresponding European Patent Application No. 22212922.3.

(Continued)

*Primary Examiner* — Eliseo Ramos Feliciano
*Assistant Examiner* — Timothy Edward Duren
(74) *Attorney, Agent, or Firm* — HARNESS, DICKEY & PIERCE, P.L.C.

(57) ABSTRACT

The present disclosure relates to an image sensor and/or a method for manufacturing the same. The image sensor may include a substrate including a first surface, a second surface opposite the first surface, and a plurality of unit pixel regions in the substrate; a pixel defining pattern; and a micro lens. Each of the plurality of unit pixel regions may include a photoelectric conversion layer. The pixel defining pattern may extend through the substrate in a first direction so as to define each of the unit pixel regions. The micro lens may be on the second surface of the substrate and corresponding to the unit pixel regions. The pixel defining pattern may include a first conductive layer and a second conductive layer spaced apart from the first conductive layer.

18 Claims, 31 Drawing Sheets

(58) Field of Classification Search
CPC ......... H01L 27/14627; H01L 27/14636; H01L 27/14685
USPC ............................................... 257/432
See application file for complete search history.

(56) References Cited

U.S. PATENT DOCUMENTS

| | | | |
|---|---|---|---|
| 8,729,678 | B2 | 5/2014 | Shim et al. |
| 9,093,287 | B2 | 7/2015 | Ko et al. |
| 10,622,396 | B2 | 4/2020 | Enomoto |
| 10,734,434 | B2 | 8/2020 | Zheng et al. |
| 10,979,621 | B2 | 4/2021 | Kim et al. |
| 11,031,434 | B2 | 6/2021 | Tsao et al. |
| 2012/0238051 | A1 | 9/2012 | Park |
| 2015/0373255 | A1* | 12/2015 | Kim .................. H04N 25/135 348/349 |
| 2017/0170229 | A1 | 6/2017 | Oh et al. |
| 2019/0043902 | A1* | 2/2019 | Lee .................. H10F 39/8033 |
| 2019/0148427 | A1* | 5/2019 | Lee .................... H10F 39/813 257/446 |
| 2019/0148457 | A1 | 5/2019 | Lee et al. |
| 2020/0119067 | A1* | 4/2020 | Choi .................. H01L 27/1463 |
| 2020/0144316 | A1 | 5/2020 | Kim et al. |
| 2020/0358971 | A1* | 11/2020 | Shim .................... H04N 25/709 |
| 2021/0136310 | A1 | 5/2021 | Uchida |
| 2021/0225919 | A1 | 7/2021 | Li et al. |
| 2021/0265405 | A1 | 8/2021 | Neya |
| 2021/0375973 | A1 | 12/2021 | Ha et al. |
| 2022/0190016 | A1* | 6/2022 | Dupoiron ............... H04N 25/75 |
| 2023/0133670 | A1* | 5/2023 | Lee .................... H01L 27/1462 257/435 |
| 2024/0429254 | A1* | 12/2024 | Noudo .................. H10F 39/805 |

FOREIGN PATENT DOCUMENTS

| | | |
|---|---|---|
| KR | 10-2018-0024072 A | 3/2018 |
| WO | WO-2019203222 A1 * | 10/2019 ....... H01L 21/02565 |
| WO | WO-2023105783 A1 * | 6/2023 |

OTHER PUBLICATIONS

European Office Action dated Apr. 25, 2023, issued in corresponding European Patent Application No. 22212922.3.
Korean Office Action dated Aug. 11, 2025 for Korean Patent Application No. 10-2021-0182305 and its English-language translation.

* cited by examiner

IMAGE SENSOR AND METHOD FOR MANUFACTURING THE SAME

CROSS-REFERENCE TO RELATED APPLICATION

This application claims priority from Korean Patent Application No. 10-2021-0182305 filed on Dec. 20, 2021 in the Korean Intellectual Property Office, and all the benefits accruing therefrom under 35 U.S.C. 119, the entire contents of which are herein incorporated by reference.

BACKGROUND

Field

The present disclosure relates to an image sensor and/or a method for manufacturing the same.

Description of Related Art

An image sensing device is a semiconductor element that converts optical information into an electrical signal. The image sensing device may include a CCD (Charge Coupled Device) image sensing device and a CMOS (Complementary Metal-Oxide Semiconductor) image sensing device.

A CMOS image sensor may be abbreviated as CIS (CMOS image sensor). The CIS may include a plurality of pixels disposed two-dimensionally. Each of the pixels may include, for example, a photodiode (PD). The photodiode may serve to convert incident light thereto into an electrical signal.

Recently, with the development of the computer industry and the communications industry, demand for miniaturized image sensing devices having improved performance is increasing in various fields such as digital cameras, camcorders, smartphones, game devices, security cameras, medical micro cameras, and robots. Accordingly, research on highly scaled and highly integrated semiconductor elements in the image sensing device is in progress. Patterns of the semiconductor elements may have fine widths and may be spaced apart from each other by a fine pitch.

SUMMARY

An aspect of the present disclosure relates to an image sensor with improved performance and/or reliability.

Another aspect of the present disclosure relates to a method for manufacturing an image sensor with improved performance and/or reliability.

Aspects and features of embodiments in the present disclosure are not limited to those discussed above. Other aspects and features of embodiments in the present disclosure that are not mentioned may be understood based on following description, and may be more clearly understood based on embodiments according to the present disclosure. Further, it will be easily understood that the purposes, effects, and advantages according to the present disclosure may be realized using means shown in the claims and combinations thereof.

According to an example embodiment of the present disclosure, an image sensor may include a substrate including a first surface and a second surface opposite each other, the substrate including a plurality of unit pixel regions in the substrate, each of the plurality of unit pixel regions including a photoelectric conversion layer; a pixel defining pattern extending through the substrate in a first direction, the pixel defining pattern defining each of the plurality of unit pixel regions; and a micro lens on the second surface of the substrate and corresponding to the plurality of unit pixel regions. The pixel defining pattern may include a first conductive layer and a second conductive layer spaced apart from the first conductive layer.

According to an example embodiment of the present disclosure, an image sensor may include a substrate including a first region, a second region, a first surface, and a second surface opposite the first surface, the substrate including a plurality of unit pixel regions in the substrate, each of the plurality of unit pixel regions including a photoelectric conversion layer; a pixel defining pattern extending through the substrate in a first direction, the pixel defining pattern defining each of the plurality of unit pixel regions, the pixel defining pattern including a first defining pattern and a second defining pattern aligned with each other in the first direction; a micro lens on the second surface of the substrate in the first region of the substrate, the micro lens corresponding to the plurality of unit pixel regions; a first pad pattern on the second surface of the substrate in the second region of the substrate, the first pad pattern being electrically connected to the first defining pattern; and a second pad pattern on the second surface of the substrate in the second region of the substrate, the second pad pattern being electrically connected to the second defining pattern. The second defining pattern may be in contact with the substrate.

According to an example embodiment of the present disclosure, an image sensor may include a substrate, a pixel defining pattern extending through the substrate, a micro lens, a first pad pattern, and a second pad pattern. The substrate may include a first region, a second region, a first surface, a second surface opposite the first surface, a first trench, and a second trench. The substrate may include a plurality of unit pixel regions in the substrate, and each of the plurality of unit pixel regions may include a photoelectric conversion layer. The second region of the substrate may include a dummy unit pixel region in the substrate. The dummy unit pixel region may include a ground area and may be free of the photoelectric conversion layer. The pixel defining pattern may extend through the substrate. The pixel defining pattern may define each of the plurality of unit pixel regions and the dummy unit pixel region. The pixel defining pattern may include a first defining pattern in the first trench and a second defining pattern in the second trench. The first defining pattern may include a liner film and a first conductive layer on the liner film. The liner film may be disposed along and on a sidewall of the first trench and a bottom surface of the first trench. The second defining pattern may include a second conductive layer. The micro lens may be on the second surface of the substrate in the first region of the substrate. The micro lens may correspond to the plurality of unit pixel regions. The first pad pattern may be on the second surface of the substrate in the second region of the substrate. The first pad pattern may be connected to the first conductive layer. The second pad pattern may be on the second surface of the substrate in the second region of the substrate. The second pad pattern may be electrically connected to the second conductive layer. The image sensor may be configured to apply a first voltage to the first conductive layer through the first pad pattern. The image sensor may be configured to apply a second voltage the second conductive layer through the second pad pattern. The image sensor may be configured to apply the second voltage to the ground area of the dummy unit pixel region.

According to an example embodiment of the present disclosure, a method for manufacturing an image sensor may include providing a substrate having a first surface and a second surface opposite each other; forming a first trench in the substrate by etching a first region of the substrate starting from the first surface of the substrate; forming a first defining pattern in the first trench; forming a second trench in the substrate by etching a second region of the substrate starting from the second surface of the substrate, the second trench exposing the first defining pattern; and forming a second defining pattern in the second trench. The first defining pattern may include a first conductive layer. The second defining pattern may include a second conductive layer spaced apart from the first conductive layer. The image sensor may be configured to apply a first voltage to the first conductive layer. The image sensor may be configured to apply a second voltage to the second conductive layer. The second voltage may be different from the first voltage.

BRIEF DESCRIPTION OF DRAWINGS

The above and other aspects and features of embodiments the present disclosure will become more apparent by describing in detail example embodiments thereof with reference to the attached drawings, in which.

DETAILED DESCRIPTION

Hereinafter, the present disclosure will be described in more detail with reference to the accompanying drawings according to some embodiments of the present disclosure. Referring to FIGS. 1 to FIG. 16, image sensors according to some embodiments will be described.

Figure 1:
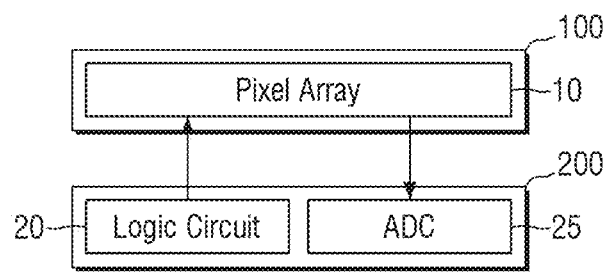
FIG. 1 is an example block diagram of an image sensor according to some embodiments.

FIG. 1 is an example block diagram of an image sensor according to some embodiments.

Referring to FIG. 1, the image sensor according to some embodiments may include a first semiconductor chip 100 and a second semiconductor chip 200. The first semiconductor chip 100 and the second semiconductor chip 200 may be disposed to overlap each other in a plan view. The first semiconductor chip 100 and the second semiconductor chip 200 may be stacked in a vertical direction.

Alternatively, the image sensor according to some embodiments may further include a third semiconductor chip. In one example, the third semiconductor chip may include a memory cell array. However, inventive concepts of the present disclosure are not limited thereto. The first to third semiconductor chips may be sequentially stacked in the vertical direction.

The first semiconductor chip 100 may include a pixel array 10. The second semiconductor chip 200 may include a logic circuit 20 and ADC (Analog Digital Converter) 25. The pixel array 10 may generate charges proportional to an amount of light entering the pixel array 10. Further, the pixel array 10 may convert an optical signal into an electrical signal, that is, an analog signal under control of the logic circuit 20. The pixel array 10 may output the analog signal to the ADC 25. The ADC 25 may convert an analog signal to a digital signal. The ADC 25 may provide data based on the digital signal.

Although not shown, the image sensor according to some embodiments may further include a memory cell array in the second semiconductor chip 200. The memory cell array may store therein the data based on the digital signal.

The data may be image data generated on a frame basis. The number of bits of the data may be determined based on a resolution of the ADC 25. The number of bits of the data may be determined based on HDR (High Dynamic Range) supported by the image sensor. Further, the bits of the data may further include at least one extension bit indicating a data generation position, information about the data, and the like.

In some embodiments, the second semiconductor chip 200 may further include a built-in processor such as an ISP (image signal processor), a DSP (digital signal processor), or the like that processes the data output from the pixel array 10. The processor may lower noise of an image data, correct an image, or perform subsequent operations related to the image output from the pixel array 10.

Figure 2:
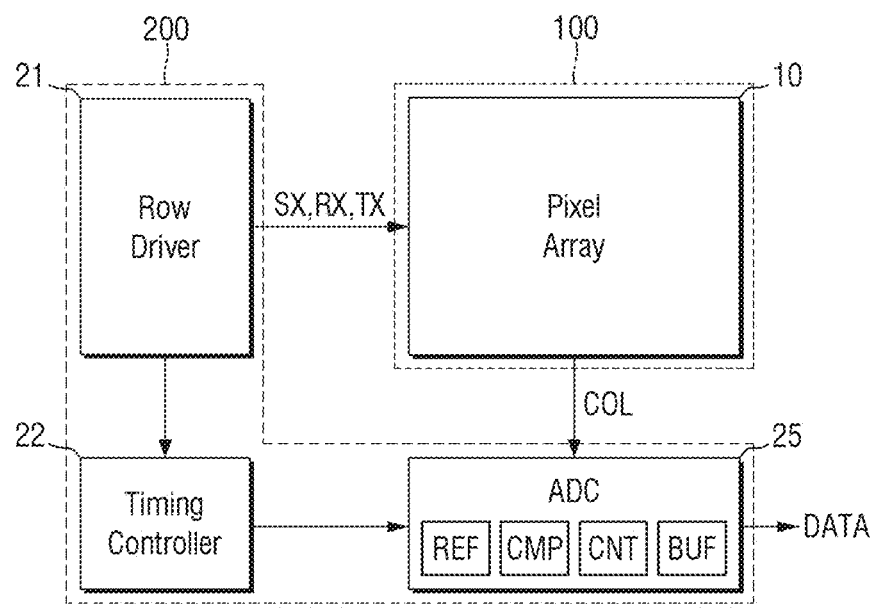
FIG. 2 is a block diagram to illustrate the pixel array, the logic circuit, and the ADC of FIG. 1.

FIG. 2 is a block diagram to illustrate the pixel array, the logic circuit, and the ADC of FIG. 1.

Referring to FIG. 2, the pixel array 10 may be implemented in the first semiconductor chip 100. The logic circuit (20 in FIG. 1) may be implemented in the second semiconductor chip 200.

The pixel array 10 may convert incident light thereto into an electrical signal. The pixel array 10 may include unit pixel regions arranged in a matrix form along a row direction and a column direction. The pixel array 10 may operate under the control of the logic circuit 20. Specifically, the logic circuit 20 may control a plurality of transistors included in the pixel array 10.

The logic circuit 20 may efficiently receive the data from the pixel array 10 and generate an image frame. For example, the logic circuit 20 may use a global shutter scheme in which all unit pixel regions are simultaneously sensed, a flutter shutter scheme that adjusts an exposure time for which all unit pixel regions are simultaneously sensed, and a rolling shutter or coded rolling shutter scheme that controls the unit pixel regions on a row basis. The logic circuit 20 may include a row driver 21, a timing controller, and the ADC 25.

The row driver 21 may control the pixel array 10 on a row basis under control of the timing controller 22. The row driver 21 may select at least one row from among rows of the pixel array 10 based on a row address. The row driver 21 may decode the row address and may be connected to a select transistor AX, a reset transistor RX, and a source follower transistor SX. The pixel array 10 may operate based on a plurality of drive signals such as a pixel select signal, a reset signal and a charge transfer signal received from the row driver 21.

The ADC 25 may be connected to the pixel array 10 through column lines COL. The ADC 25 may convert the analog signals received from the pixel array 10 through the column lines COL into the digital signals. The number of the ADCs 25 may be determined based on the number of the column lines COL and the number of unit pixel regions arranged along one row. The number of the ADCs 25 may be at least one. However, inventive concepts of the present disclosure are not limited thereto.

For example, the ADC 25 may include a reference signal generator REF, a comparator CMP, a counter CNT, and a buffer BUF. The reference signal generator REF may generate a ramp signal having a specific slope and provide the ramp signal as a reference signal of the comparator. The comparator CMP may compare the analog signal and the ramp signal of the reference signal generator REF with each other, and may output comparison signals having respective transition times based on valid signal components. The counter CNT may perform a counting operation to generate a counting signal and may provide the counting signal to the buffer BUF. The buffer BUF may include latch circuits connected to the column lines COL, respectively, and may latch the counting signal output from the counter CNT in response to the transition of the comparison signal on a column basis, and may output the latched counting signal as the data.

In some embodiments, the logic circuit 20 may further include correlated double sampling (CDS) circuits which obtain a difference between a reference voltage representing a reset state of each of the unit pixel regions and an output voltage representing a signal component corresponding to the incident light to perform correlation double the sampling, and output an analog sampling signal corresponding to a valid signal component. The correlated double sampling circuits may be connected to the column lines COL.

The timing controller 22 may control an operation timing of each of the row driver 21 and the ADC 25. The timing controller 22 may provide a timing signal and a control signal to each of the row driver 21 and the ADC 25. More specifically, the timing controller 22 may control the ADC 25. The ADC 25 may provide the data to the logic circuit 20 under control of the timing controller 22. Further, the timing controller 22 may further include circuits that provide a request, a command, or an address to the logic circuit 20 so that the data of the ADC 25 is stored in the memory cell array.

Figure 3:
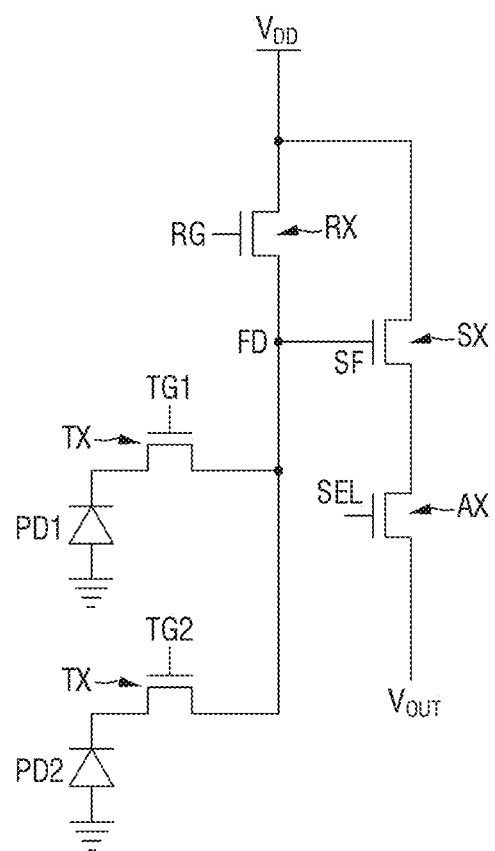
FIG. 3 is a circuit diagram to illustrate a unit pixel region of a pixel array of FIG. 1.

FIG. 3 is a circuit diagram to illustrate a unit pixel region of a pixel array of FIG. 1. For reference, FIG. 3 may be based on a 4T structure of each of the unit pixel regions constituting the pixel array.

Referring to FIG. 3, the pixel array may include photoelectric conversion layers PD1 and PD2, transfer transistors TX, a floating diffusion area FD, a reset transistor RX, a source follower transistor SX and a select transistor AX.

The photoelectric conversion layers PD1 and PD2 may generate electric charges in proportion to an amount of light incident thereto from an outside. Each of the photoelectric conversion layers PD1 and PD2 may be embodied as a photodiode including an n-type impurity area and a p-type impurity area. Each of the photoelectric conversion layers PD1 and PD2 may be coupled to each transfer transistor TX that transmits charges generated and accumulated in each of the photoelectric conversion layers PD1 and PD2 to the floating diffusion area FD. The floating diffusion area FD may refer to an area that converts the charges into a voltage. Since the floating diffusion area FD has parasitic capacitance, the charges may be stored in the floating diffusion area FD in a cumulative manner.

One end of each transfer transistor TX may be connected to each of the photoelectric conversion layers PD1 and PD2, while the other end of each transfer transistor TX may be connected to the floating diffusion area FD. The transfer transistor TX may be embodied as a transistor operating based on a desired and/or alternatively predefined bias, for example, a transfer signal. The transfer signal may be applied thereto through each of transfer gates TG1 and TG2. That is, each transfer transistor TX may transmit the charges generated from each of the photoelectric conversion layers PD1 and PD2 to the floating diffusion area FD based on each of the transfer signals.

The source follower transistor SX may amplify change in an electrical potential of the floating diffusion area FD upon receiving the charges from the photoelectric conversion layers PD1 and PD2, and output the amplified change to an output line $V_{OUT}$. When the source follower transistor SX is turned on, a desired and/or alternatively predefined electrical potential, for example, a power voltage $V_{DD}$ provided to a drain of the source follower transistor SX may be delivered to a drain area of the select transistor AX. A source follower gate SF of the source follower transistor SX may be connected to the floating diffusion area FD.

The select transistor AX may select the unit pixel region to be read on a row basis. The select transistor AX may be embodied as a transistor driven by a select line that applies a desired and/or alternatively predefined bias, for example, a row select signal. The row select signal may be applied thereto through a select gate SEL.

The reset transistor RX may periodically reset the floating diffusion area FD. The reset transistor RX may be embodied as a transistor driven by a reset line that applies a desired and/or alternatively predefined bias, for example, a reset signal. The reset signal may be applied thereto through a reset gate RG. When the reset transistor RX is turned on based on the reset signal, a desired and/or alternatively predefined electrical potential, for example, the power voltage $V_{DD}$ provided to a drain of the reset transistor RX may be transferred to the floating diffusion area FD.

In FIG. 3, a structure in which the photoelectric conversion layers PD1 and PD2 electrically share one floating diffusion area FD is illustrated. However, inventive concepts of the present disclosure are not limited thereto. For example, one unit pixel region may include one of the photoelectric conversion layers PD1 and PD2, the floating diffusion area FD and the four transistors TX, RX, AX, and SX, and the reset transistor RX, the source follower transistor SX, or the select transistor AX may be shared by neighboring unit pixel regions. Further, the number of photoelectric conversion layers PD1 and PD2 electrically sharing one floating diffusion area FD is not limited thereto.

Accordingly, integration of the image sensor according to some embodiments may be improved.

Unlike the example as shown, as a size of the unit pixel region becomes smaller, the photoelectric conversion layer PD and the transfer transistor TX may be formed in one semiconductor chip, while the reset transistor RX, the source follower transistor SX and the select transistor AX may be formed in the other semiconductor chip. The semiconductor chips may be aligned with each other to constitute the unit pixel regions.

Figure 4:
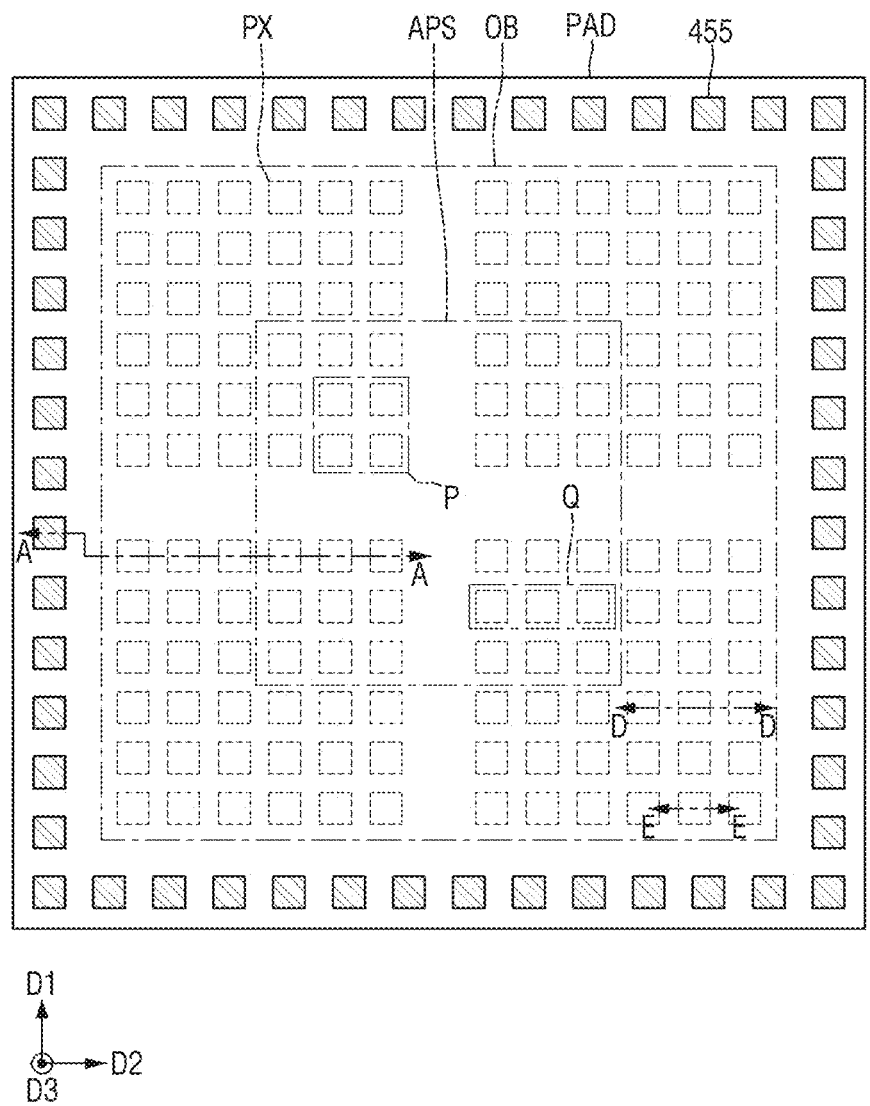
FIG. 4 is an example plan view of an image sensor according to some embodiments.
Figure 5:
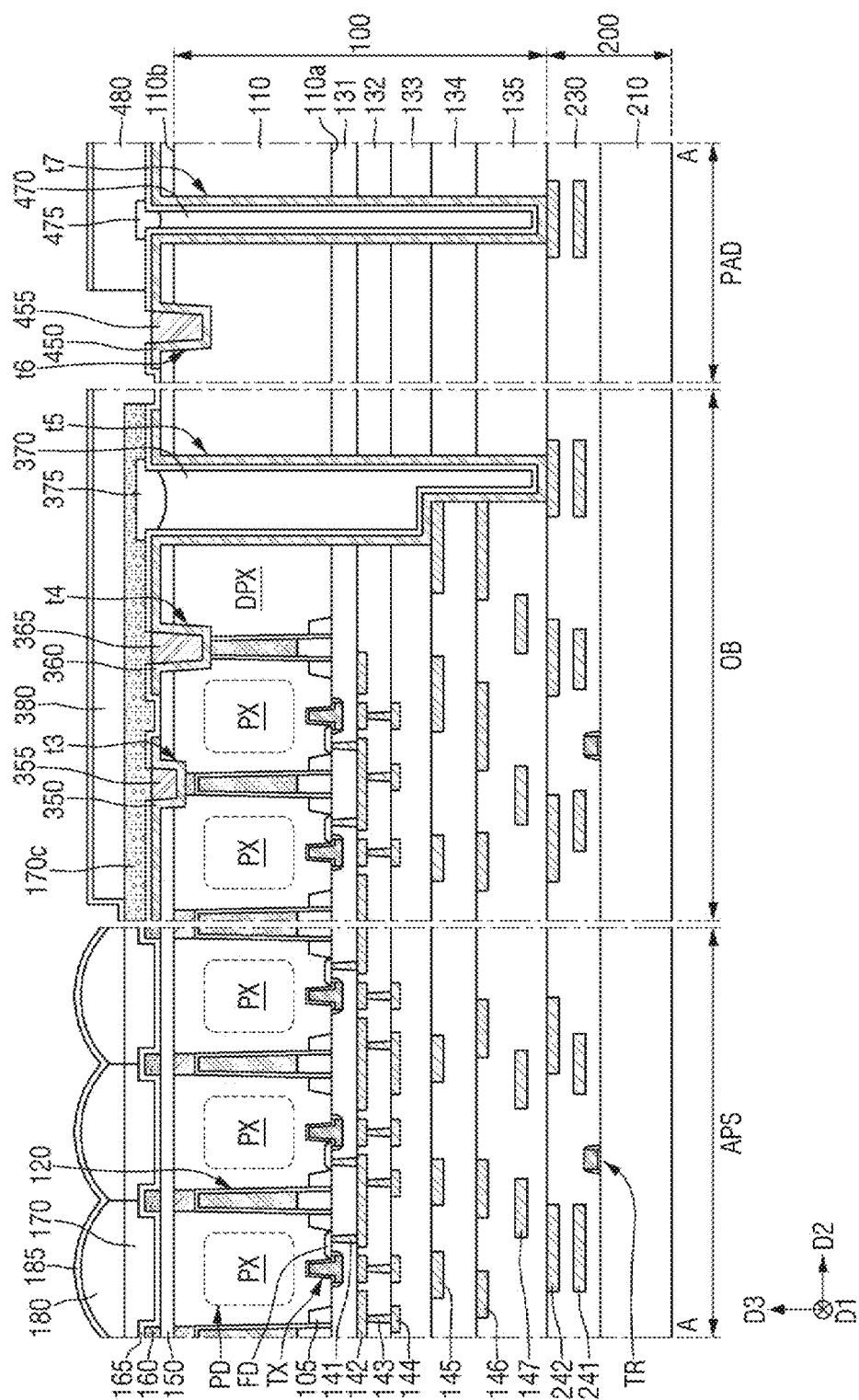
FIG. 5 is a cross-sectional view taken along a line A-A of FIG. 4.

FIG. 4 is an example plan view of an image sensor according to some embodiments. FIG. 5 is a cross-sectional view taken along a line A-A of FIG. 4.

Referring to FIGS. 4 and FIG. 5, the image sensor according to some embodiments may include the first semiconductor chip 100 and the second semiconductor chip 200. The first semiconductor chip 100 may act as a sensor chip, while the second semiconductor chip 200 may act as a logic chip.

The first semiconductor chip 100 may include a light-receiving area APS, a light-blocking area OB, and a pad area PAD. In the light-receiving area APS, and the light-blocking area OB, a plurality of unit pixel regions PX may be arranged two-dimensionally, for example, in a matrix form. The unit pixel regions PX may be arranged in a matrix form in a plane across which a first direction D1 and a second direction D2 extend. The first direction D1 and the second direction D2 may intersect each other. The first direction D1 and the second direction D2 may be substantially perpendicular to each other. A third direction D3 may be substantially perpendicular to the first direction D1 and the second direction D2.

In the light-receiving area APS, active pixels that receive light and generate an active signal may be arranged. Optical black pixels generating an optical black signal by blocking light may be arranged in the light-blocking area OB. The light-blocking area OB may be disposed, for example, along a perimeter of the light-receiving area APS. However, this is only an example. In some embodiments, dummy unit pixel regions DPX may be arranged in the light-blocking area OB. The dummy unit pixel region DPX may refer to an area of a pixel that does not generate the active signal.

The pad area PAD may be disposed around the light-blocking area OB. The pad area PAD may be disposed adjacent to an edge of the image sensor according to some embodiments. However, this is only an example. The pad area PAD may be configured to be connected to an external device and the like to transmit/receive an electrical signal between the image sensor according to some embodiments and the external device. For example, a third pad pattern 455 may be disposed on a first substrate 110 of the pad area PAD. The third pad pattern 455 may be connected to the external device, etc.

The image sensor according to some embodiments may include the first substrate 110, a pixel defining pattern 120, a surface insulating film 150, a first color filter 170, a grid pattern 160, a micro lens 180, a second substrate 210, a first pad pattern 365, a second pad pattern 355, and the third pad pattern 455.

The first substrate 110 may be embodied as a semiconductor substrate. For example, the first substrate 110 may be made of bulk silicon or an SOI (silicon-on-insulator). The first substrate 110 may be a silicon substrate, or may be made of a material other than silicon, for example, silicon germanium, indium antimonide, lead tellurium compound, indium arsenide, indium phosphide, gallium arsenide or gallium antimonide. Alternatively, the first substrate 110 may include a base substrate and an epitaxial layer formed on the base substrate.

The first substrate 110 may include a first surface 110a and a second surface 110b opposite to each other. In some embodiments, the second surface 110b of the first substrate 110 may be a light receiving surface on which light is incident. That is, the image sensor according to some embodiments may be embodied as a backside-illuminated (BSI) image sensor.

A plurality of unit pixel regions PX may be formed in the first substrate 110 and in the light-receiving area APS and the light-blocking area OB. Each unit pixel region PX may include a photoelectric conversion layer PD. A dummy unit pixel region DPX that does not include a photoelectric conversion layer PD may be included in the first substrate 110 and in the light-blocking area OB. However, inventive concepts of the present disclosure are not thereto. A signal generated from the dummy unit pixel region DPX may be used as information to remove process noise afterwards.

Each unit pixel region PX may include the photoelectric conversion layer PD, the floating diffusion area FD and the transfer transistor TX. The photoelectric conversion layer PD may be formed in the first substrate 110 and in each of the light-receiving area APS and the light-blocking area OB. The photoelectric conversion layer PD may generate an electric charge in proportion to the amount of light incident thereto from the outside. The photoelectric conversion layer PD may transmit the generated and accumulated charges therein to the floating diffusion area FD.

The floating diffusion area FD may be formed in the first substrate 110 and in each of the light-receiving area APS and the light-blocking area OB. The floating diffusion area FD may be formed in the first surface 110a of the first substrate 110. The charge transmitted to the floating diffusion area FD may be applied to the source follower gate SF in FIG. 3.

The transfer transistor TX may be embedded in the first substrate 110. One end of the transfer transistor TX may be connected to the photoelectric conversion layer PD, while the other end of the transfer transistor TX may be connected to the floating diffusion area FD. The transfer transistor TX may transmit the charges generated from the photoelectric conversion layer PD to the floating diffusion area FD.

The transfer transistor TX may include a transfer gate, a gate insulating film, and a gate spacer. The transfer gate may include a portion embedded in the first substrate 110. The gate insulating film may be disposed between the transfer gate and the first substrate 110. The gate spacer may be disposed on each of both opposing side walls of the transfer gate.

The pixel defining pattern 120 may be formed in the first substrate 110. The pixel defining pattern 120 may be formed by filling an insulating material in a deep trench formed by patterning the first substrate 110. The pixel defining pattern 120 may extend through the first substrate 110 in the third direction D3. For example, the pixel defining pattern 120 may extend from the first surface 110a to the second surface 110b. The pixel defining pattern 120 may be embodied as FDTI (front deep trench isolation).

The pixel defining pattern 120 may define each of the plurality of unit pixel regions PX and the dummy unit pixel region DPX. The pixel defining pattern 120 may be arranged in a grid manner in a plan view to space the plurality of unit pixel regions PX and the dummy unit pixel region DPX from each other.

In some embodiments, an element isolation pattern 105 may be provided. The element isolation pattern 105 may be disposed within the first substrate 110. For example, the element isolation pattern 105 may be received in a trench in which a portion of the first substrate 110 is recessed. The trench may be recessed from the first surface 110*a* of the first substrate 110. The element isolation pattern 105 may be embodied as a shallow trench isolation (STI) film. The element isolation pattern 105 may define each of active areas (ACT in FIG. 6A).

A width in the second direction D2 of the element isolation pattern 105 may gradually decrease as the pattern 105 extends from the first surface 110*a* of the first substrate 110 toward the second surface 110*b* thereof. The element isolation pattern 105 may overlap the pixel defining pattern 120 in the second direction D2 or the first direction D1. The pixel defining pattern 120 may extend through the element isolation pattern 105 in the third direction D3. The element isolation pattern 105 may include an insulating material. The element isolation pattern 105 may include, for example, at least one of silicon nitride, silicon oxide, and silicon oxynitride.

The image sensor according to some embodiments may further include first line insulating films 131, 132, 133, 134, and 135. The first line insulating films 131, 132, 133, 134, and 135 may be formed on the first surface 110*a* of the first substrate 110. For example, the first line insulating films 131, 132, 133, 134, and 135 may cover the first surface 110*a* of the first substrate 110. The first substrate 110 and the first line insulating films 131, 132, 133, 134, and 135 may constitute the first semiconductor chip 100. In FIG. 5, it is illustrated that the number of the first line insulating films 131, 132, 133, 134, and 135 is five. However, the present disclosure is not limited thereto. The number of the first line insulating films 131, 132, 133, 134, and 135 are only an example.

Each of the first line insulating films 131, 132, 133, 134, and 135 may include, for example, at least one of silicon oxide, silicon nitride, silicon oxynitride, and a low dielectric constant (low-k) material having a lower dielectric constant than that of silicon oxide. However, inventive concepts of the present disclosure are not thereto.

A plurality of first contacts 141 and 143 and a plurality of first line patterns 142, 144, 145, 146, and 147 may be disposed in the first line insulating films 131, 132, 133, 134, and 135. The plurality of first contacts 141 and 143 may electrically connect the floating diffusion area FD to the plurality of first line patterns 142, 144, 145, 146, and 147. Some of the plurality of first line patterns 142, 144, 145, 146, and 147 may be connected to a first connective structure 360. However, inventive concepts of the present disclosure are not thereto.

Each of the first contacts 141 and 143 and the first line patterns 142, 144, 145, 146, 147 may include, for example, at least one of tungsten (W), copper (Cu), aluminum (Al), gold (Au), silver (Ag), and alloys thereof. However, inventive concepts of the present disclosure are not thereto.

The second substrate 210 may be made of bulk silicon or SDI (silicon-on-insulator). The second substrate 210 may be embodied as a silicon substrate, or may be made of a material other than silicon, for example, silicon germanium, indium antimonide, lead telluride compound, indium arsenide, indium phosphide, gallium arsenide or gallium antimonide. Alternatively, the second substrate 210 may include a base substrate and an epitaxial layer formed on the base substrate.

The second substrate 210 may include an upper surface and a bottom surface. The upper surface of the second substrate 210 may be a face facing the first semiconductor chip 100. The bottom surface of the second substrate 210 may be a face opposite to the upper surface of the second substrate 210.

A plurality of transistors TR may be formed on the upper surface of the second substrate 210. The transistors TR may be, for example, logic circuits. The transistors TR may control the transfer transistor TX, the reset transistor (RX of FIG. 3), the select transistor (AX of FIG. 3), and the source follower transistor (SX of FIG. 3).

A second line insulating film 230 may be formed on the second substrate 210. For example, the second line insulating film 230 may cover the upper surface of the second substrate 210. The second substrate 210 and the second line insulating film 230 may constitute the second semiconductor chip 200. The second line insulating film 230 may include, for example, at least one of silicon oxide, silicon nitride, silicon oxynitride, and a low dielectric constant (low-k) material having a lower dielectric constant than that of silicon oxide. However, inventive concepts of the present disclosure are not thereto.

A plurality of second line patterns 241 and 242 may be disposed in the second line insulating film 230. The plurality of second line patterns 241 and 242 may be connected to the transistors TR, respectively, and may be connected to the floating diffusion area FD of the first semiconductor chip 100. Some of the plurality of second line patterns 241 and 242 may be connected to the first connective structure 360. Further, the other of the plurality of second line patterns 241 and 242 may be connected to a third connective structure 450. However, inventive concepts are not limited thereto.

Each of the second line patterns 241 and 242 may include, for example, at least one of tungsten (W), copper (Cu), aluminum (Al), gold (Au), silver (Ag), and alloys thereof. However, inventive concepts of the present disclosure are not thereto.

The surface insulating film 150 may be formed on the second surface 110*b* of the first substrate 110. The surface insulating film 150 may extend along the second surface 110*b* of the first substrate 110. In some embodiments, at least a portion of the surface insulating film 150 may contact the pixel defining pattern 120.

The surface insulating film 150 may include an insulating material. For example, the surface insulating film 150 may include at least one of silicon oxide, silicon nitride, silicon oxynitride, aluminum oxide, hafnium oxide, and a combination thereof. However, inventive concepts of the present disclosure are not thereto.

The surface insulating film 150 functions as an anti-reflective film to limit and/or prevent reflection of light incident on the first substrate 110, thereby improving light reception of the photoelectric conversion layer PD. Further, the surface insulating film 150 functions as a planarization film, so that the first color filter 170 and the micro lens 180 which will be described later may be formed at a uniform vertical level.

The first color filter 170 may be formed on the surface insulating film 150 and in the light-receiving area APS. In some embodiments, the first color filter 170 may be disposed to correspond to each unit pixel region PX. For example, the plurality of first color filters 170 may be arranged two-dimensionally, for example, in a matrix form.

The first color filter 170 may include various color filters based on the unit pixel region PX. For example, the first color filter 170 may be arranged in a Bayer pattern including a red color filter, a green color filter, and a blue color filter. However, this is only an example. The first color filter 170 may include a yellow filter, a magenta filter, and a cyan filter, and may further include a white filter.

The grid pattern 160 may be formed on the surface insulating film 150. The grid pattern 160 may be formed in a grid shape in the plan view and may be interposed between the plurality of first color filters 170.

The grid pattern 160 may include a low refractive index material having a refractive index lower than that of silicon (Si). For example, the grid pattern 160 may include at least one of silicon oxide, aluminum oxide, tantalum oxide, and a combination thereof. However, inventive concepts of the present disclosure are not thereto. The grid pattern 160 including the low refractive index material may refract or reflect the light incident obliquely to the image sensor to improve the quality of the image sensor.

In some embodiments, a first protective film 165 may be formed on the surface insulating film 150 and the grid pattern 160. The first protective film 165 may be interposed between the surface insulating film 150 and the first color filter 170 and between the grid pattern 160 and the first color filter 170. For example, the first protective film 165 may extend along a profile of an upper surface of the surface insulating film 150 and a side face and an upper surface of the grid pattern 160.

The first protective film 165 may include, for example, aluminum oxide. However, inventive concepts of the present disclosure are not thereto. The first protective film 165 may limit and/or prevent damage to the surface insulating film 150 and the grid pattern 160.

The micro lens 180 may be formed on the first color filter 170. The micro lens 180 may be disposed to correspond to each unit pixel region PX. For example, the micro lenses 180 may be arranged two-dimensionally, for example, in a matrix form in a plan view.

The micro lens 180 has a convex shape and may have a desired and/or alternatively predefined radius of curvature. Accordingly, the micro lens 180 may condense the light to be incident on the photoelectric conversion layer PD. The micro lens 180 may include, for example, a light-transmissive resin. However, inventive concepts of the present disclosure are not limited thereto.

In some embodiments, a second protective film 185 may be formed on the micro lens 180. The second protective film 185 may extend along a surface of the micro lens 180. The second protective film 185 may include, for example, an inorganic oxide film. For example, the second protective film 185 may include at least one of silicon oxide, titanium oxide, zirconium oxide, hafnium oxide, and combinations thereof. However, inventive concepts of the present disclosure are not limited thereto. In some embodiments, the second protective film 185 may include a low-temperature oxide (LTO).

The second protective film 185 may protect the micro lens 180 from the outside. For example, the second protective film 185 may include an inorganic oxide film to protect the micro lens 180 including an organic material. Further, the second protective film 185 may improve light condensing ability of the micro lens 180. For example, the second protective film 185 may fill a space between the micro lenses 180 to reduce reflection, refraction, and scattering of incident light reaching the space between the micro lenses 180.

The image sensor according to some embodiments may further include the first connective structure 360, a second connective structure 350, and the third connective structure 450.

The first connective structure 360 may be formed in the light-blocking area OB. The first connective structure 360 may limit and/or prevent light from being incident to the light-blocking area OB. The first connective structure 360 may be formed on the surface insulating film 150 and in the light-blocking area OB. The first connective structure 360 may be in contact with the pixel defining pattern 120. The first connective structure 360 may be in contact with a first defining pattern (121 in FIG. 7) of the pixel defining pattern 120.

For example, a fourth trench t4 exposing the first defining pattern 121 may be formed in the first substrate 110 and the surface insulating film 150 and in the light-blocking area OB. The first connective structure 360 may be formed in the fourth trench t4 and may contact the first defining pattern 121 in the light-blocking area OB. The first connective structure 360 may extend along a profile of a sidewall and a bottom surface of the fourth trench t4.

The first connective structure 360 may be electrically connected to the first defining pattern 121. For example, the first connective structure 360 may be electrically connected to a first conductive layer (121F of FIG. 7) of the first defining pattern 121. The first connective structure 360 may include, for example, a titanium (Ti) film, a titanium nitride (TiN) film, and a tungsten (W) film that are sequentially stacked.

In some embodiments, on the first connective structure 360, the first pad pattern 365 may be formed. The first pad pattern 365 may fill a remaining portion of the fourth trench t4 which the first connective structure 360 does not fill. A first voltage may be applied to the first defining pattern 121 of the pixel defining pattern 120 through the first pad pattern 365. For example, the first voltage may be applied to the first conductive layer (121F of FIG. 7) via the first pad pattern 365 and the first connective structure 360 including the conductive material. The first voltage may be a negative voltage. Accordingly, charges generated due to ESD, etc. may be discharged to the first pad pattern 365 through the first defining pattern 121, such that ESD bruising defect may be effectively limited and/or prevented.

The first pad pattern 365 may include, for example, at least one of tungsten (W), copper (Cu), aluminum (Al), gold (Au), silver (Ag), and alloys thereof. However, inventive concepts of the present disclosure are not limited thereto.

The second connective structure 350 may be formed in the light-blocking area OB. The second connective structure 350 may limit and/or prevent light from being incident to the light-blocking area OB. The second connective structure 350 may be formed on the surface insulating film 150 and in the light-blocking area OB. The second connective structure 350 may be in contact with the pixel defining pattern 120. The second connective structure 350 may be in contact with a second defining pattern (desired and/or alternatively predetermined in FIG. 7) of the pixel defining pattern 120. The second connective structure 350 may be in contact with a second conductive layer of the pixel defining pattern 120. The second defining pattern may be referred to as the second conductive layer.

For example, a third trench t3 exposing the second defining pattern 122 may be formed in the first substrate 110 and the surface insulating film 150 and in the light-blocking area OB. The second connective structure 350 may be formed in the third trench t3 so as to contact the second defining pattern 122 in the light-blocking area OB. The second connective structure 350 may extend along a profile of a sidewall and a bottom surface of the third trench t3.

The second connective structure 350 may be electrically connected to the second defining pattern 122. For example, the second connective structure 350 may be electrically connected to the second conductive layer of the second defining pattern 122. The second connective structure 350 may include, for example, a titanium (Ti) film, a titanium nitride (TiN) film, and a tungsten (W) film that are sequentially stacked.

In some embodiments, on the second connective structure 350, the second pad pattern 355 may be formed. The second pad pattern 355 may fill a remaining portion of the third trench t3 which the second connective structure 350 does not fill. A second voltage may be applied to the second defining pattern 122 of the pixel defining pattern 120 through the second pad pattern 355 and the second connective structure 350 including the conductive material. For example, the second voltage may be applied to the second conductive layer 122 through the second pad pattern 355 and the second connective structure 350. The second voltage may be a well bias voltage.

The second pad pattern 355 may include, for example, at least one of tungsten (W), copper (Cu), aluminum (Al), gold (Au), silver (Ag), and alloys thereof. However, inventive concepts of the present disclosure are not limited thereto.

In some embodiments, a fifth trench t5 may be formed in the first substrate 110 and in the light-blocking area OB. The fifth trench t5 may expose a portion of each of the first line patterns 145 and 146 of the first semiconductor chip 100. The fifth trench t5 may expose a portion of the second line pattern 242 of the second semiconductor chip 200. The first connective structure 360 may be formed in the fifth trench t5 so as to connect the first line patterns 145 and 146 to the second line pattern 242. The first connective structure 460 may extend along a sidewall and a bottom surface of the fifth trench t5.

In some embodiments, on the first connective structure 360, a first filling insulating film 370 may be formed. The first filling insulating film 370 may fill a remaining portion of the fifth trench t5 which the first connective structure 360 does not fill. The first filling insulating film 370 may include, for example, at least one of silicon oxide, aluminum oxide, tantalum oxide, and a combination thereof. However, inventive concepts of the present disclosure are not limited thereto.

In some embodiments, a first capping pattern 375 may be formed on the first filling insulating film 370. The first capping pattern 375 may include a silicon-based insulating material (e.g., silicon nitride, silicon oxide, and silicon oxynitride), and a high dielectric material (e.g., hafnium oxide, and aluminum oxide). The first capping pattern 375 may include the same material as that of a capping film 121C. However, inventive concepts of the present disclosure are not limited thereto.

In some embodiments, a second color filter 170C may be formed on the first connective structure 360 and the second connective structure 350. For example, the second color filter 170C may be formed to cover a portion of the first protective film 165 in the light-blocking area OB. The second color filter 170C may include, for example, a blue color filter. However, inventive concepts of the present disclosure are not limited thereto.

In some embodiments, a third protective film 380 may be formed on the second color filter 170C. For example, the third protective film 380 may be formed to cover a portion of the first protective film 165 in the light-blocking area OB. In some embodiments, the second protective film 185 may extend along a surface of the third protective film 380. The third protective film 380 may include, for example, a light-transmissive resin. However, inventive concepts of the present disclosure are not limited thereto. In some embodiments, the third protective film 380 may contain the same material as that of the micro lens 180.

The third connective structure 450 may be formed in the pad area PAD. The third connective structure 450 may be formed on the surface insulating film 150 and in the pad area PAD.

In some embodiments, a sixth trench t6 may be formed in the first substrate 110 and in the pad area PAD. The third connective structure 450 may fill a portion of the sixth trench t6. The third connective structure 450 may be formed along a sidewall and a bottom surface of the sixth trench t6.

A seventh trench t7 exposing the second line pattern 242 may be formed in the second semiconductor chip 200 and in the pad area PAD. The third connective structure 450 may fill a portion of seventh trench t7. The third connective structure 450 may be formed along a sidewall and a bottom surface of the seventh trench t7.

The third connective structure 450 may be formed in the seventh trench t7 so as to contact a portion of the second line pattern 242. The third connective structure 450 may electrically connect a portion of the second line pattern 242 to the third pad pattern 455. The third connective structure 450 may include, for example, a titanium (Ti) film, a titanium nitride (TiN) film, and a tungsten (W) film that are sequentially stacked.

On the third connective structure 450, the third pad pattern 455 may be formed. The third pad pattern 455 may fill a remaining portion of the sixth trench t6 which the third connective structure 450 does not fill. The third pad pattern 455 may include, for example, at least one of tungsten (W), copper (Cu), aluminum (Al), gold (Au), silver (Ag), and alloys thereof. However, inventive concepts of the present disclosure are not limited thereto.

In some embodiments, a portion of the third pad pattern 455 may be exposed. For example, an exposure opening partially exposing the third pad pattern 455 may be formed. Accordingly, the third pad pattern 455 may be configured to be connected to an external device and the like so as to transmit/receive an electrical signal between the image sensor according to some embodiments and the external device.

A second filling insulating film 470 may be formed on the third connective structure 450. The second filling insulating film 470 may fill a remaining portion of the seventh trench t7 which the third connective structure 450 does not fill. The second filling insulating film 470 may include, for example, at least one of silicon oxide, aluminum oxide, tantalum oxide, and a combination thereof. However, inventive concepts of the present disclosure are not limited thereto.

In some embodiments, a second capping pattern 475 may be formed on the second filling insulating film 470. The second capping pattern 475 may include a silicon-based insulating material (e.g., silicon nitride, silicon oxide, and silicon oxynitride) and a high dielectric material (e.g., hafnium oxide, and aluminum oxide). The second capping pattern 475 may include the same material as that of the capping film 121C. However, inventive concepts of the present disclosure are not limited thereto.

In some embodiments, a fourth protective film 480 may be formed on the third connective structure 450 and in the pad area PAD. For example, the fourth protective film 480 may be formed to cover a portion of the first protective film 165 in the pad area PAD. In some embodiments, the second protective film 185 may extend along a surface of the fourth protective film 480. The fourth protective film 480 may include, for example, a light-transmissive resin. However, inventive concepts of the present disclosure are not limited thereto. In some embodiments, the fourth protective film 480 may include the same material as that of the micro lens 180.

Figure 6A:
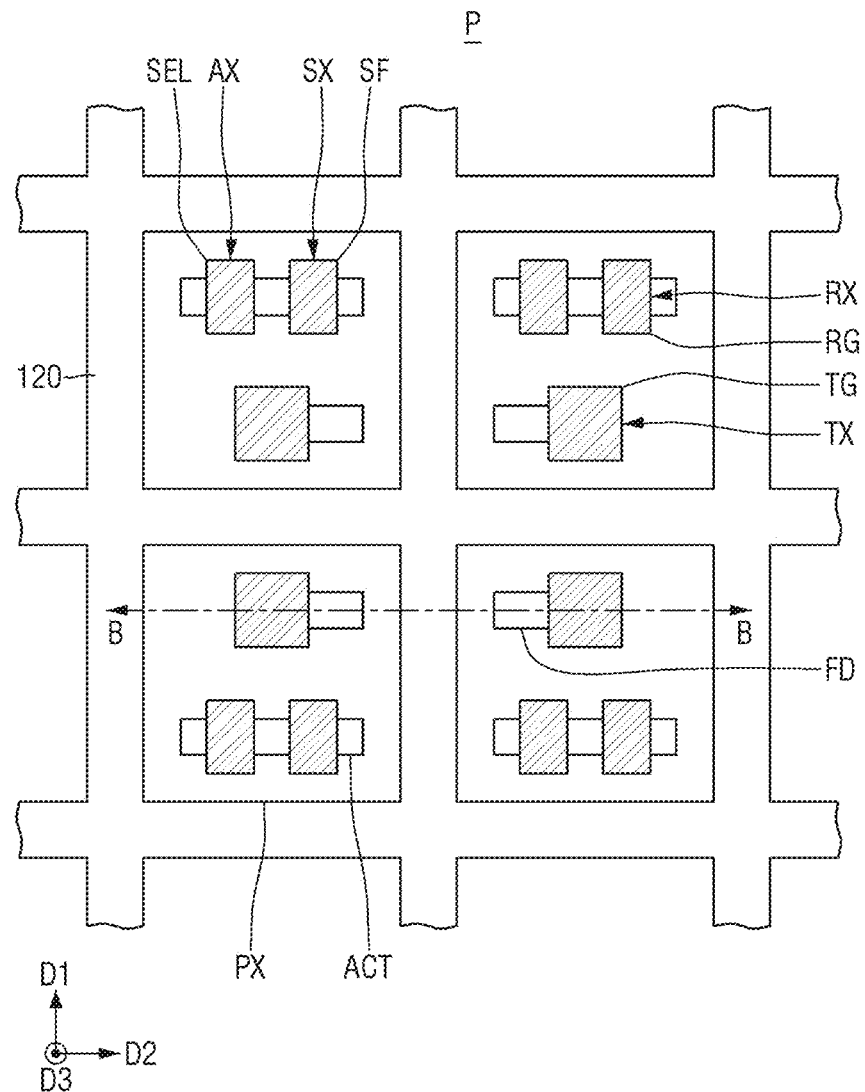
FIG. 6A and FIG. 6B are enlarged views of a P area of FIG. 4.
Figure 6B:
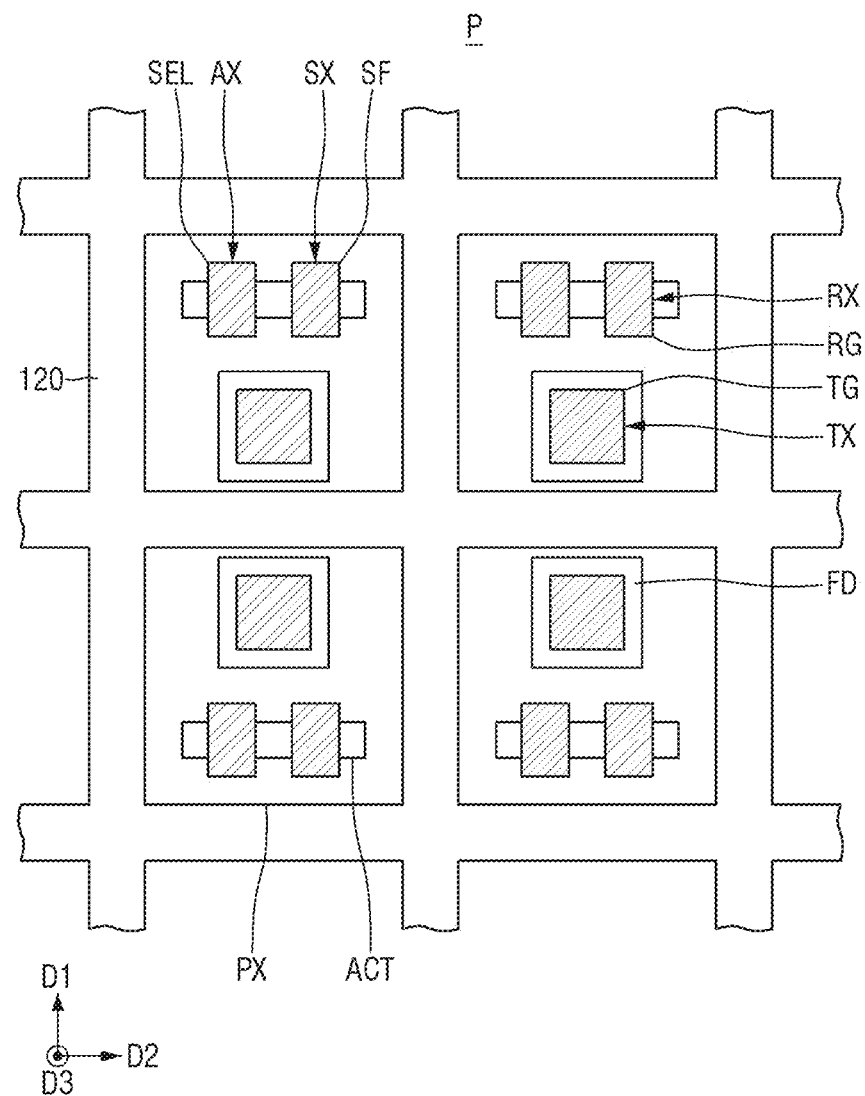
Figure 7:
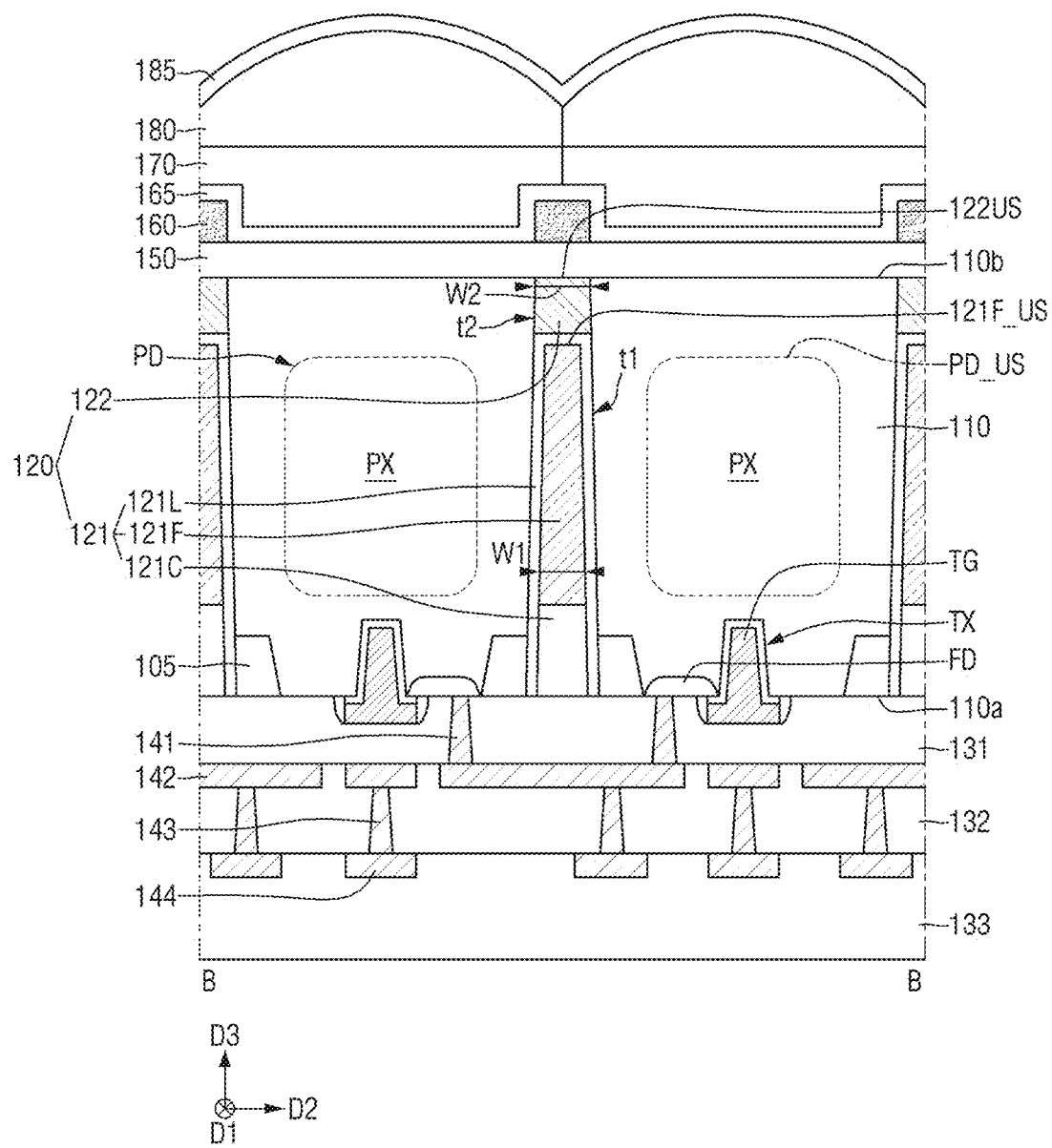
FIG. 7 is a cross-sectional view taken along a line B-B of FIG. 6A.

FIG. 6A and FIG. 6B are enlarged views of a P area of FIG. 4. FIG. 7 is a cross-sectional view taken along a line B-B of FIG. 6A. Hereinafter, with reference to FIG. 6A to FIG. 7, the image sensor according to some embodiments will be described in more detail.

Referring to FIG. 6A to FIG. 7, the element isolation pattern 105 may define each of the active areas ACT.

In the plan view, each of the active areas ACT may have a line shape extending in the second direction D2. However, the shape of each of the active areas ACT is not limited to the shape shown in FIG. 6A and FIG. 6B, and may be variously modified. The floating diffusion area FD, the transfer transistor TX, and the select transistor AX, the reset transistor RX, and the source follower transistor SX may be disposed on the active areas ACT. The transfer transistor TX may include the transfer gate TG.

In FIG. 6A, the floating diffusion area FD may be disposed on one side of the transfer transistor TX. The floating diffusion area FD may have a conductivity type opposite to that of the first substrate 110. For example, an n-type impurity may be doped in the floating diffusion area FD. In FIG. 6B, the floating diffusion area FD may surround the transfer gate TG of the transfer transistor TX.

In some embodiments, a portion of the unit pixel region PX may contain the select transistor AX, and the source follower transistor SX. The select transistor AX may include the select gate SEL, and the source follower transistor SX may include the source follower gate SF. Another portion of the unit pixel region PX may contain the reset transistor RX. The reset transistor RX may include the reset gate RG. However, inventive concepts of the present disclosure are not limited thereto, and the arrangement and the number of the transistors included in the unit pixel region PX may be modified.

In some embodiments, the pixel defining pattern 120 may define each of the unit pixel regions PX. For example, the pixel defining pattern 120 may be disposed between adjacent unit pixel regions PX. In the plan view, the pixel defining pattern 120 may have a grid structure. In the plan view, the pixel defining pattern 120 may surround an entirety of each of the unit pixel regions PX. The pixel defining pattern 120 may be arranged in a grid structure extending in the first direction D1 and the second direction D2.

In a cross-sectional view, the pixel defining pattern 120 may extend through the first substrate 110 in the third direction D3. The pixel defining pattern 120 may extend from the first surface 110a of the first substrate 110 to the second surface 110b thereof. The pixel defining pattern 120 may be embodied as a deep trench isolation (DTI) film. A width in the second direction D2 of the pixel defining pattern 120 may gradually decrease as the pattern 120 extends from the first surface 110a of the first substrate 110 toward the second surface 110b thereof. However, inventive concepts of the present disclosure are not limited thereto.

In some embodiments, the pixel defining pattern 120 may include the first defining pattern 121 and the second defining pattern 122. The first defining pattern 121 may be disposed in the first trench t1. The second defining pattern 122 may be disposed in the second trench t2. The first trench t1 and the second trench t3 may be aligned with each other in the third direction D3. That is, the first defining pattern 121 and the second defining pattern 122 may be aligned with each other in the third direction D3.

The first defining pattern 121 may include a liner film 121L, the first conductive layer 121F, and the capping film 121C. The liner film 121L may be disposed along and on a sidewall and a bottom surface of the first trench t1. In the present disclosure, the bottom surface of the first trench t1 is defined as a face facing the first surface 110a of the first substrate 110. The first conductive layer 121F may be disposed on the liner film 121L. The capping layer 121C may be disposed on the first conductive layer 121F.

The liner film 121L may include an oxide film having a lower refractive index than that of the first substrate 110. For example, the liner film 121L may include at least one of silicon oxide, aluminum oxide, tantalum oxide, and a combination thereof. However, inventive concepts of the present disclosure are not limited thereto. The liner film 121L which has a lower refractive index than that of the first substrate 110 may refract or reflect light incident obliquely to the photoelectric conversion layer PD. Further, the liner film 121L may limit and/or prevent photoelectric charges generated in a specific unit pixel region PX due to the incident light from random drifting and moving to a unit pixel region PX adjacent thereto. That is, the liner film 121L may improve the light reception of the photoelectric conversion layer PD to improve the quality of the image sensor according to some embodiments.

In some embodiments, the first conductive layer 121F may include a conductive material. For example, the first conductive layer 121F may include, but is not limited to, polysilicon (poly Si). In some embodiments, a negative voltage may be applied to the first conductive layer 121F including the conductive material. Accordingly, ESD (electrostatic discharge) bruising defect of the image sensor according to some embodiments may be effectively limited and/or prevented. In this regard, the ESD bruising defect refers to a phenomenon in which electric charges generated by ESD etc. accumulate on a surface (for example, the second surface 110b) of the substrate, resulting in bruising-like stains on the image.

In some embodiments, the capping film 121C may include an insulating material. For example, the capping layer 121C may include a silicon-based insulating material (e.g., silicon nitride, silicon oxide, and silicon oxynitride) and a high dielectric material (e.g., hafnium oxide, and aluminum oxide). The capping film 121C may include the same material as that of each of the first capping pattern 375 and the second capping pattern 475. However, inventive concepts of the present disclosure are not limited thereto.

The second defining pattern 122 may be disposed in the second trench t2. The second defining pattern 122 may include the second conductive layer. In one example, the second defining pattern 122 may be composed of the second conductive layer. The second defining pattern 122 may be in contact with the first substrate 110. The second conductive layer 122 may be in contact with the first substrate 110. Hereinafter, the second defining pattern 122 is referred to as the second conductive layer 122. In some embodiments, the second conductive layer 122 may be a single layer. However, inventive concepts of the present disclosure are not limited thereto. In some embodiments, an upper surface 122US of the second conductive layer 122 may be coplanar with the second surface 110b of the first substrate 110.

The second conductive layer 122 may include a conductive material. The second conductive layer 122 may include, for example, polysilicon (poly Si) or silicon doped with arsenic (As), phosphorus (P), or carbon (C). However, inventive concepts of the present disclosure are not limited thereto. The first conductive layer 121F and the second conductive layer 122 may include the same material. However, inventive concepts of the present disclosure are not limited thereto. The material constituting the second conductive layer 122 may be different from the material constituting the first conductive layer 121F. In this case, the material constituting the second conductive layer 122 and the material constituting the first conductive layer 121F may have etch selectivity relative to each other. When the material constituting the second conductive layer 122 is different from the material constituting the first conductive layer 121F, the first conductive layer 121F may include polysilicon, while the second conductive layer 122 may include a metal material. However, inventive concepts of the present disclosure are not limited thereto.

In some embodiments, the second voltage may be applied to the second conductive layer 122 including the conductive material. The second voltage may be a well bias voltage. As the well bias voltage is applied to the second conductive layer 122, a separate ground area may not be disposed on the first surface 110a of the first substrate 110. A ground voltage may be applied to the first substrate 110 through the second conductive layer 122. The second conductive layer 122 is in contact with the first substrate 110, such that when the second voltage is applied to the second conductive layer 122, the second voltage may be applied to the first substrate 110. Accordingly, the image sensor with improved integration may be manufactured.

The first conductive layer 121F and the second conductive layer 122 may be spaced apart from each other. The first conductive layer 121F and the second conductive layer 122 may be spaced apart from each other in the third direction D3. The first conductive layer 121F and the second conductive layer 122 may be electrically insulated from each other. The liner film 121L including an insulating material may be disposed between the first conductive layer 121F and the second conductive layer 122. Different voltages may be respectively applied to the first conductive layer 121F and the second conductive layer 122. For example, the first voltage may be applied to the first conductive layer 121F, while the second voltage may be applied to the second conductive layer 122.

In some embodiments, the first conductive layer 121F includes an upper surface 121F_US. The upper surface 121F_US of the first conductive layer 121F may face the second surface 110b of the first substrate 110. The photoelectric conversion layer PD includes an upper surface PD_US. The upper surface PD_US of the photoelectric conversion layer PD may face the second surface 110b of the first substrate 110.

In some embodiments, a vertical level of the upper surface 121F_US of the first conductive layer 121F based on the first surface 110a of the first substrate 110 is higher than that of the upper surface PD_US of the photoelectric conversion layer PD based on the first surface 110a of the first substrate 110. Accordingly, the first conductive layer 121F may overlap an entirety of the photoelectric conversion layer PD in the second direction D2. In some embodiments, a vertical length of the first conductive layer 121F may be greater than a vertical length of the second conductive layer 122.

In some embodiments, a width W1 in the second direction D2 of the first conductive layer 121F may be smaller than a width W2 in the second direction D2 of the second conductive layer 122. Because the first conductive layer 121F is disposed between both opposing liner films 121L, and the second conductive layer 122 is a single layer filling the second trench t2, the width W1 in the second direction D2 of the first conductive layer 121F may be smaller than the width W2 in the second direction D2 of the second conductive layer 122.

Figure 8:
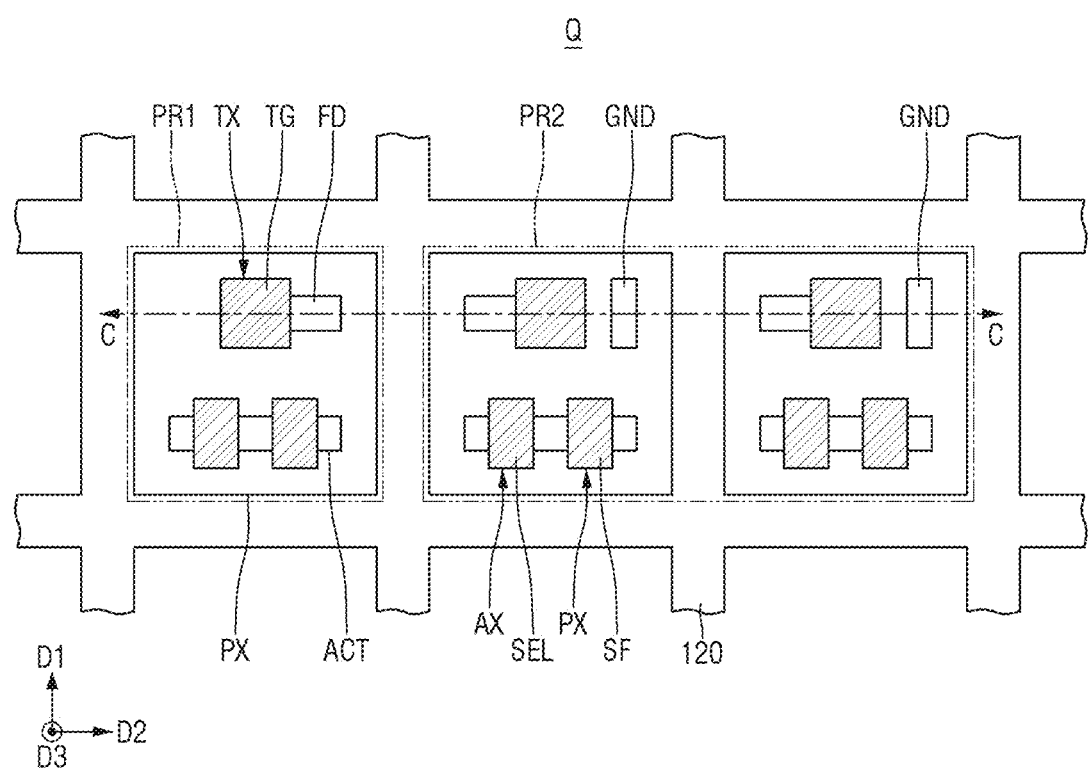
FIG. 8 is an enlarged view of a Q area of FIG. 4.
Figure 9:
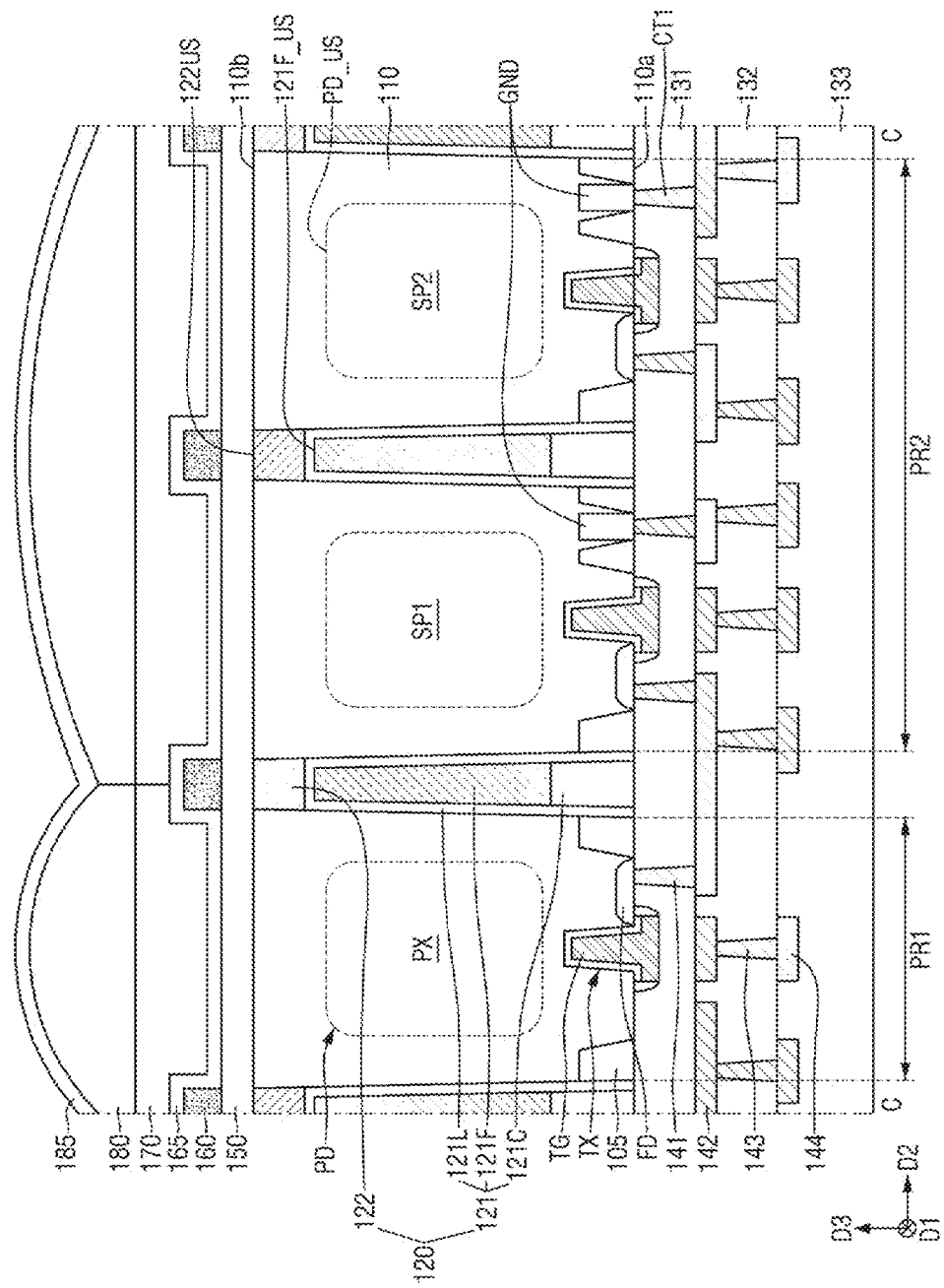
FIG. 9 is a cross-sectional view taken along a line C-C in FIG. 8.

FIG. 8 is an enlarged view of a Q area of FIG. 4. FIG. 9 is a cross-sectional view taken along a line C-C in FIG. 8. For convenience of description, following descriptions are based on differences thereof from those described using FIG. 6A to FIG. 7.

Referring to FIG. 4, FIG. 8, and FIG. 9, in the light-receiving area APS, the unit pixel region PX may include a first pixel region PR1 and a second pixel region PR2.

The first pixel region PR1 and the second pixel region PR2 may be adjacent to each other and may be spaced from each other. The first pixel region PR1 may be the same as the unit pixel region PX described using FIG. 6A to FIG. 7.

The second pixel region PR2 may include a first sub-pixel SP1 and a second sub-pixel SP2. The first sub-pixel SP1 and the second sub-pixel SP2 may be adjacent to each other. In FIG. 8, the first sub-pixel SP1 and the second sub-pixel SP2 are shown to be aligned with each other in the second direction D2. However, inventive concepts of the present disclosure are not limited thereto.

The second pixel region PR2 may include a ground area GND. That is, each of the first sub-pixel SP1 and the second sub-pixel SP2 may include the ground area GND in a pixel area thereof. On the contrary, the first pixel region PR1 may not include the ground area GND.

In each of the first sub-pixel SP1 and the second sub-pixel SP2, the ground area GND may be disposed on one side of the transfer transistor TX. Unlike the illustration, the ground area GND may be formed in an area in each of the first sub-pixel SP1 and the second sub-pixel SP2 other than an area on one side of the transfer transistor TX.

In FIG. 9, the ground area GND may be disposed between opposing portions of the element isolation pattern 105. That is, in each of the first and second sub-pixels SP1 and SP2, the element isolation pattern 105 may define the ground area GND.

The image sensor according to some embodiments may further include a first ground contact CT1 connected to the ground area GND. The first ground contact CT1 may be connected to the ground area GND, and may apply the second voltage to the ground area GND. The second voltage may be, for example, a well bias voltage. That is, the voltage applied to the ground area GND and the voltage applied to the second conductive layer 122 may be the same as each other.

In some embodiments, the first sub-pixel SP1 and the second sub-pixel SP2 may share the micro lens 180. That is, one micro lens 180 may cover the first sub-pixel SP1 and the second sub-pixel SP2. The first sub-pixel SP1 and the second sub-pixel SP2 share the micro lens 180, so that signals respectively generated from the first sub-pixel SP1 and the second sub-pixel SP2 may be used as information for auto-focusing in an ISP (image signal processor) of the logic chip.

Figure 10:
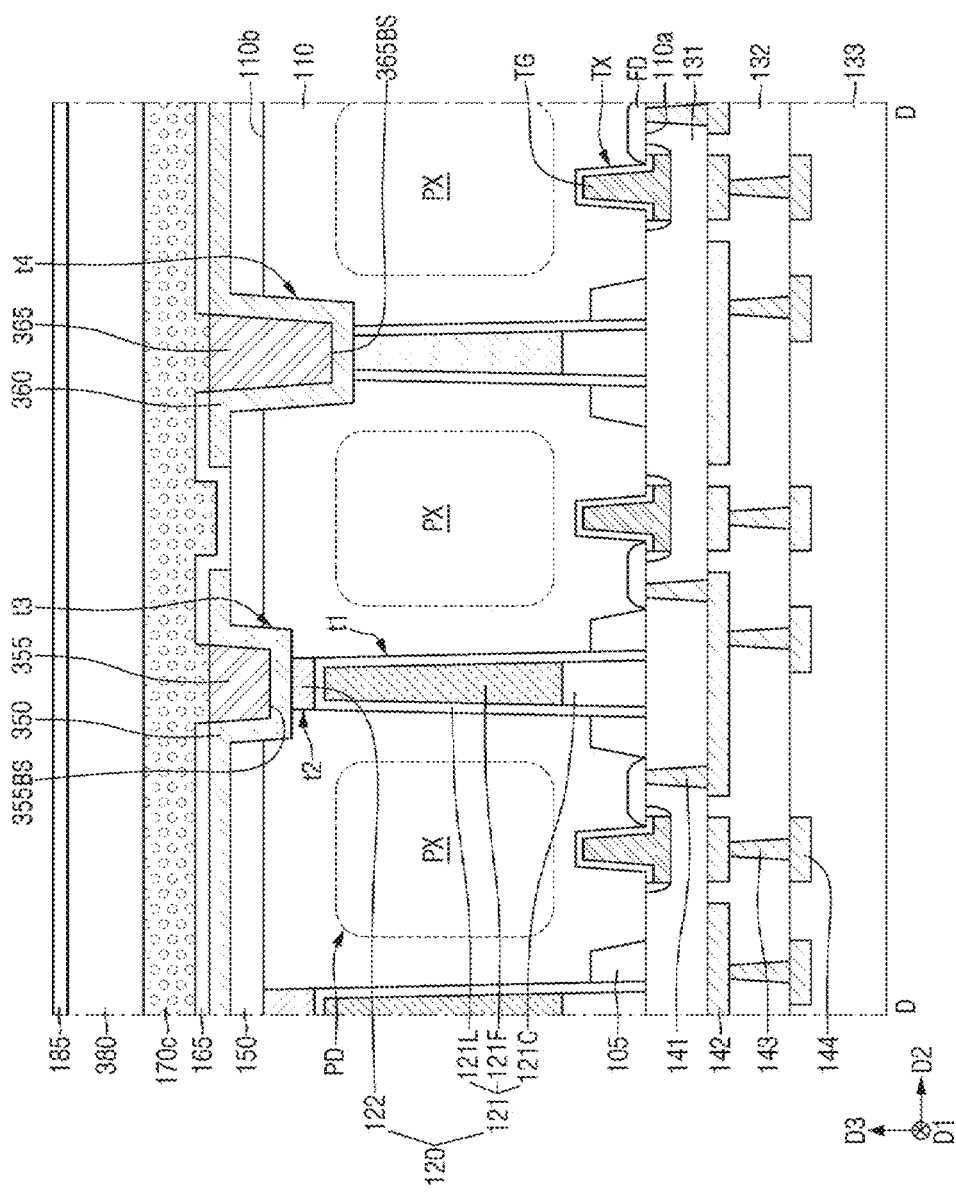
FIG. 10 is a cross-sectional view taken along a line D-D of FIG. 4.

FIG. 10 is a cross-sectional view taken along a line D-D of FIG. 4. For convenience of description, following descriptions are based on differences thereof from those described using FIG. 4 and FIG. 5.

Referring to FIG. 10, the image sensor according to some embodiments may include the first pad pattern 365 and the second pad pattern 355.

The first pad pattern 365 may fill a portion of the fourth trench t4. The first pad pattern 365 may be connected to the first conductive layer 121F of the first defining pattern 121. The first pad pattern 365 may be electrically connected to the first conductive layer 121F of the first defining pattern 121. Accordingly, the first voltage may be applied to the first conductive layer 121F through the first pad pattern 365. The first voltage may be, for example, a negative voltage.

The second pad pattern 355 may fill a portion of the third trench t3. The second pad pattern 355 may be connected to the second conductive layer 122. The second pad pattern 355 may be electrically connected to the second conductive layer 122. Accordingly, the second voltage may be applied to the second conductive layer 122 through the second pad pattern 355. The second voltage may be different from the first voltage. The second voltage may be, for example, a well bias voltage.

In some embodiments, a depth in the third direction D3 of the first pad pattern 365 may be greater than a depth in the third direction D3 of the second pad pattern 355. For example, the first pad pattern 365 may include a bottom surface 365BS. The bottom surface 365BS of the first pad pattern 365 may face the second surface 110b of the first substrate 110. The second pad pattern 355 may include a bottom surface 355BS. The bottom surface 355BS of the second pad pattern 355 may face the second surface 110b of the first substrate 110.

A vertical level of the bottom surface 365BS of the first pad pattern 365 based on the first surface 110a of the first substrate 110 may be lower than that of the bottom surface 355BS of the second pad pattern 355 based on the first surface 110a of the first substrate 110. That is, the bottom surface 365BS of the first pad pattern 365 may be closer to the first surface 110a of the first substrate 110 than the bottom surface 355BS of the second pad pattern 355 may be. Further, the first pad pattern 365 may include a portion that does not overlap with the second pad pattern 355 in the second direction D2. Because the first pad pattern 365 is connected to the first conductive layer 121F, the second pad pattern 355 is connected to the second conductive layer 122, and the first conductive layer 121F and the second conductive layer 122 are spaced apart from each other in the third direction D3, a vertical level of the bottom surface 365BS of the first pad pattern 365 based on the first surface 110a of the first substrate 110 may be lower than that of the bottom surface 355BS of the second pad pattern 355 based on the first surface 110a of the first substrate 110.

Figure 11:
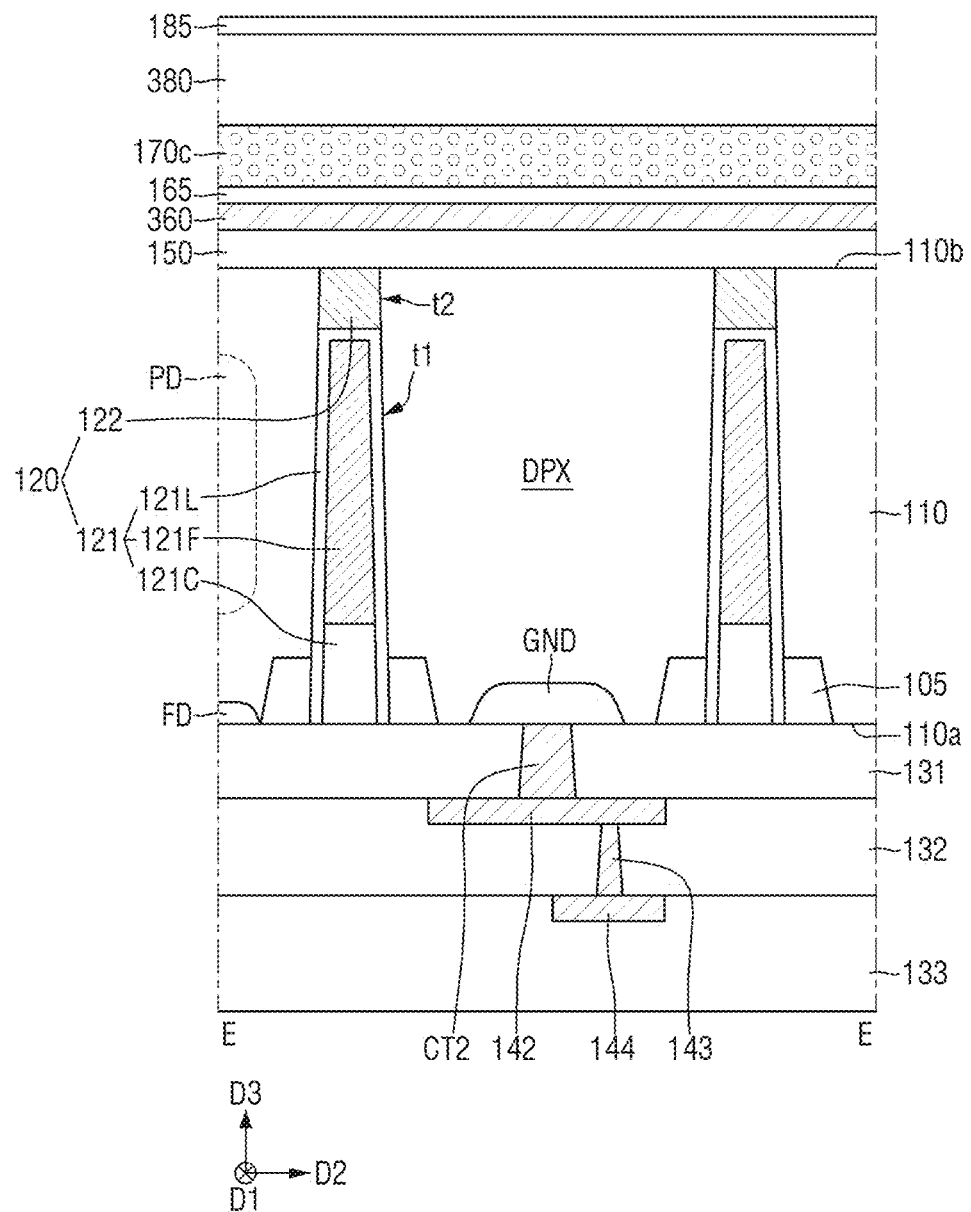
FIG. 11 is a cross-sectional view taken along a line E-E of FIG. 4.

FIG. 11 is a cross-sectional view taken along a line E-E of FIG. 4. For convenience of description, following descriptions are based on differences thereof from those described using FIG. 4 and FIG. 5.

Referring to FIG. 11, in the image sensor according to some embodiments, the dummy unit pixel region DPX may include the ground area GND.

In the dummy unit pixel region DPX, the ground area GND may be disposed in the first surface 110a of the first substrate 110. The ground area GND may be disposed between opposing portions of the element isolation pattern 105. A well bias voltage may be applied to the ground area GND. For example, a second ground contact CT2 connected to the ground area GND may be provided. The well bias voltage may be applied to the ground area GND through the second ground contact CT2. The voltage applied to the ground area GND of the dummy unit pixel region DPX and the voltage applied to the second conductive layer 122 may be identical with each other.

Figure 12:
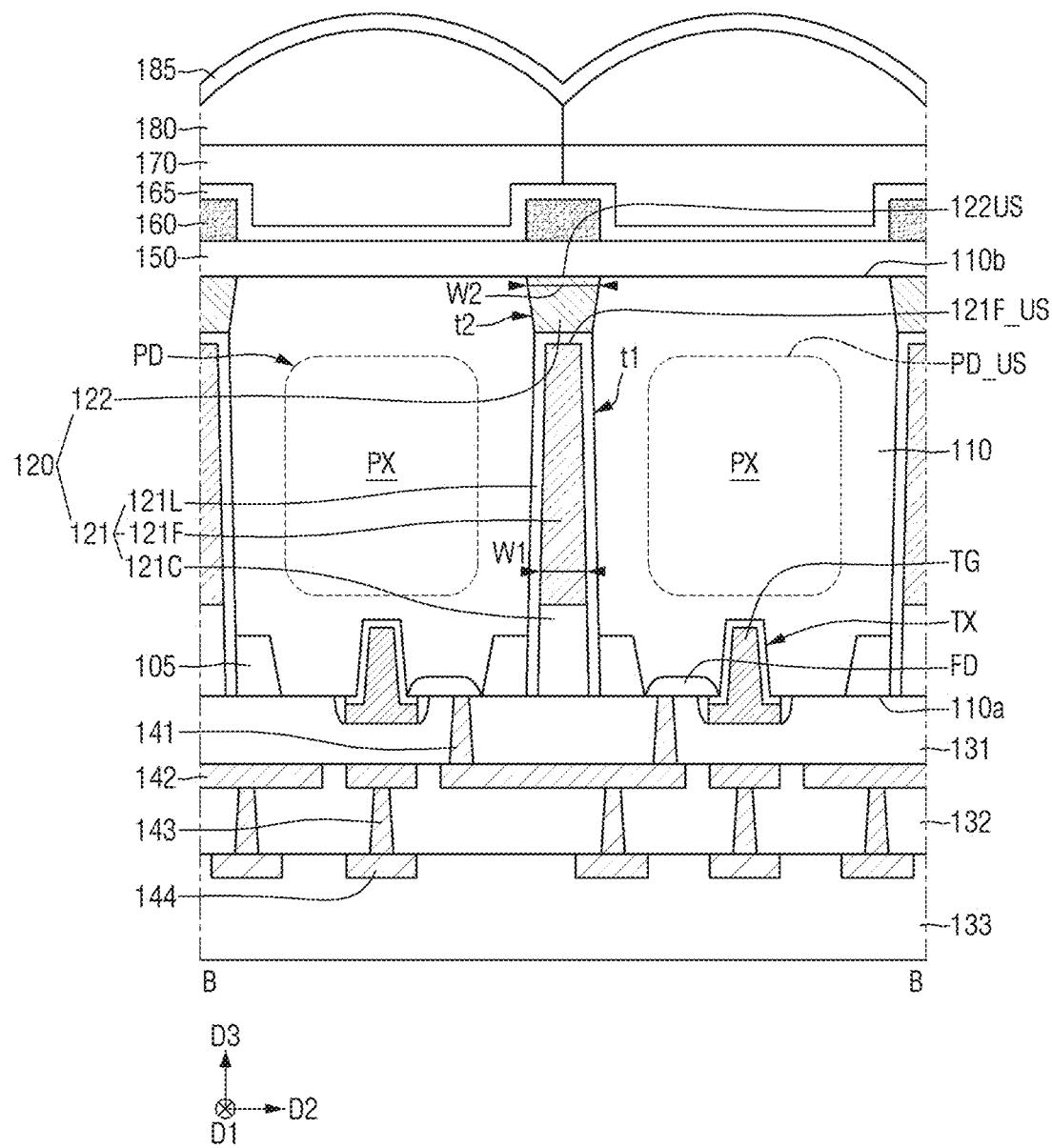
FIG. 12 is an example cross-sectional view of an image sensor according to some embodiments.

FIG. 12 is an example cross-sectional view of an image sensor according to some embodiments. For convenience of description, following descriptions are based on differences thereof from those described using FIG. 6A to FIG. 7.

Referring to FIG. 12, the pixel defining pattern 120 may be disposed in the first trench t1 and the second trench t2. The pixel defining pattern 120 may include the first defining pattern 121 and the second defining pattern 122. The first defining pattern 121 may fill the first trench t1, and the second defining pattern 122 may fill the second trench t2. The second defining pattern 122 may refer to the second conductive layer.

The second trench t2 may be recessed from the second surface 110b of the first substrate 110. That is, a width in the second direction D2 of the second trench t2 may gradually decrease as the trench t2 extends from the second surface 110b of the first substrate 110 toward the first surface 110a thereof. The first trench t1 may be recessed from the first surface 110a of the first substrate 110. That is, a width in the second direction D2 of the first trench t1 may gradually decrease as the trench t1 extends from the first surface 110a of the first substrate 110 toward the second surface 110b thereof.

A width in the second direction D2 of the pixel defining pattern 120 may gradually decrease and then gradually increase as the pattern 120 extends from the first surface 110a of the first substrate 110 toward the second surface 110b thereof.

In some embodiments, at a boundary between the first trench t1 and the second trench t2, a width in the second direction D2 of the first trench t1 may be the same as a width in the second direction D2 of the second trench t2. However, inventive concepts of inventive concepts of the present disclosure are not limited thereto.

Figure 13:
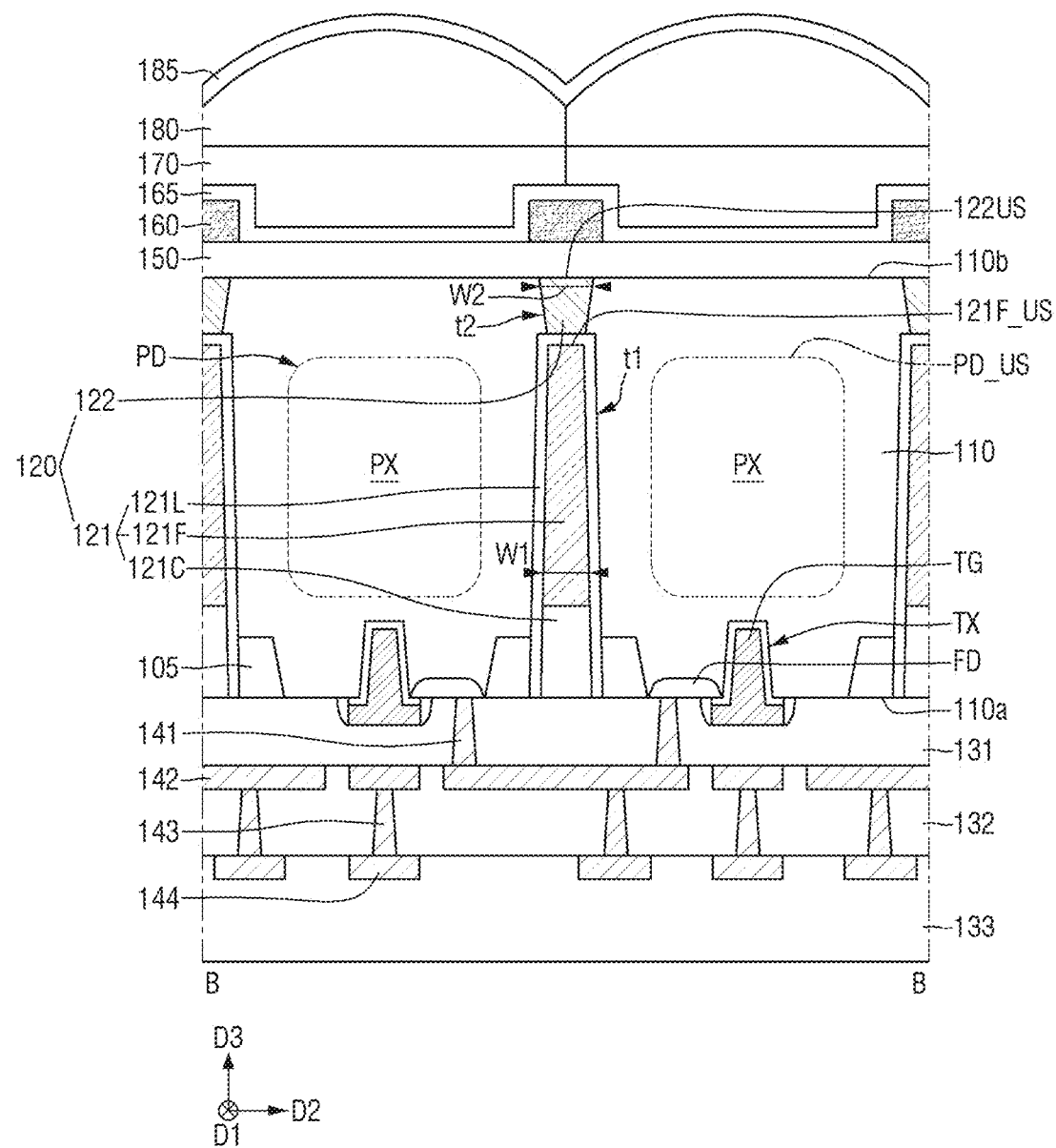
FIG. 13 is an example cross-sectional view of an image sensor according to some embodiments.

FIG. 13 is an example cross-sectional view of an image sensor according to some embodiments. For convenience of description, following descriptions are based on differences thereof from those described using FIG. 6A to FIG. 7 and FIG. 12.

Referring to FIG. 13, at the boundary between the first trench t1 and the second trench t2, the width in the second direction D2 of the first trench t1 and the width in the second direction D2 of the second trench t2 may be different from each other.

For example, at the boundary between the first trench t1 and the second trench t2, the width in the second direction D2 of the first trench t1 may be greater than the width in the second direction D2 of the second trench t2. This structure may be generated when the first trench t1 and the second trench t2 are not aligned with each other in a process of forming the second trench t2 after forming the first defining pattern 121.

Figure 14:
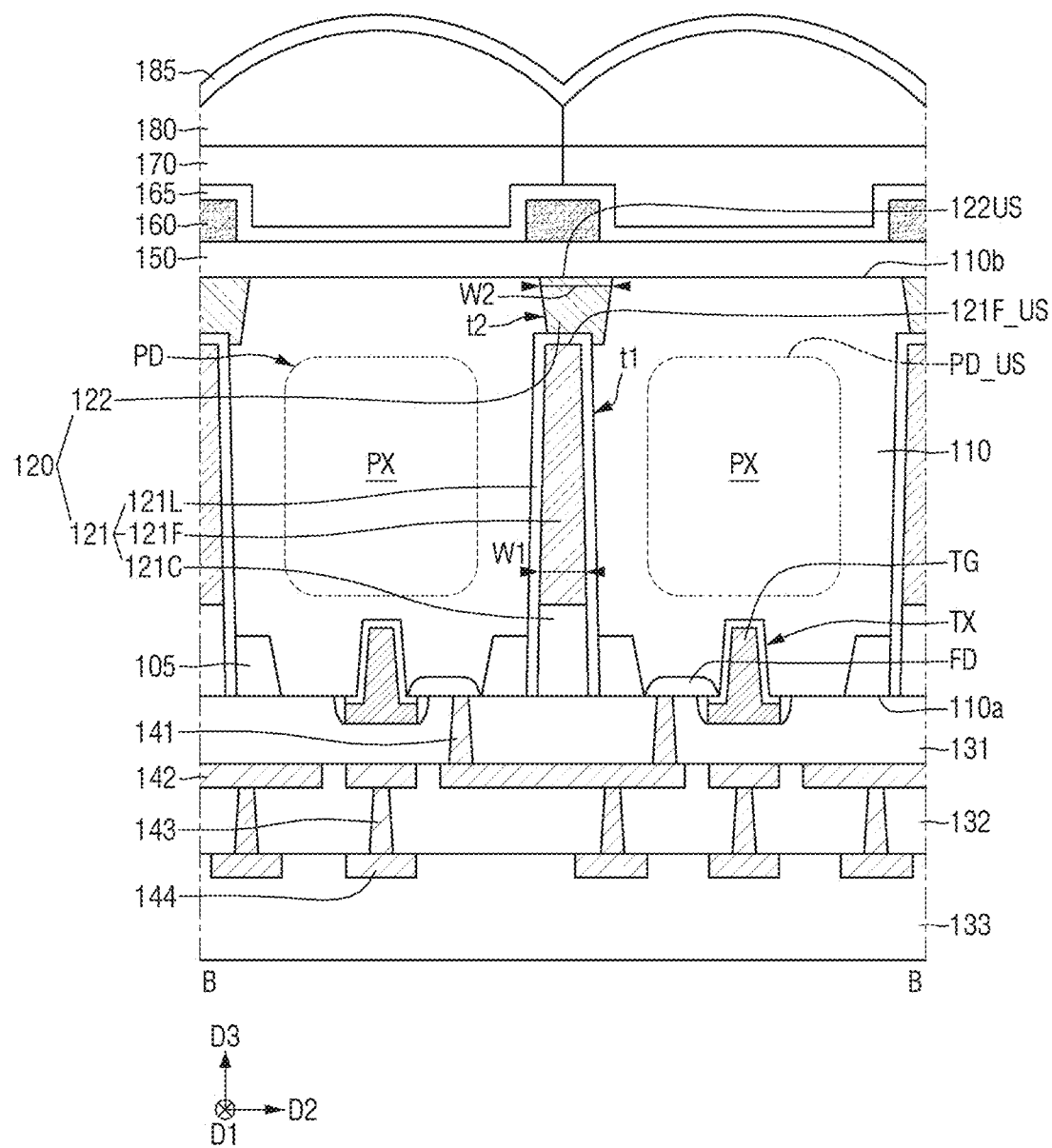
FIG. 14 is an example cross-sectional view of an image sensor according to some embodiments.

FIG. 14 is an example cross-sectional view of an image sensor according to some embodiments. For convenience of description, following descriptions are based on differences thereof from those described using FIG. 6A to FIG. 7 and FIG. 12.

Referring to FIG. 14, a portion of the second conductive layer 122 may overlap the first defining pattern 121 in the second direction D2.

In the process of forming the second trench t2 after forming the first defining pattern 121, the first trench t1 and the second trench t2 may not be aligned with each other. In this case, a portion of the second trench t2 may overlap with the first defining pattern 121 in the second direction D2. When the second conductive layer 122 fills the second trench t2, the first defining pattern 121 and the second conductive layer 122 may partially overlap each other in the second direction D2.

Figure 15:
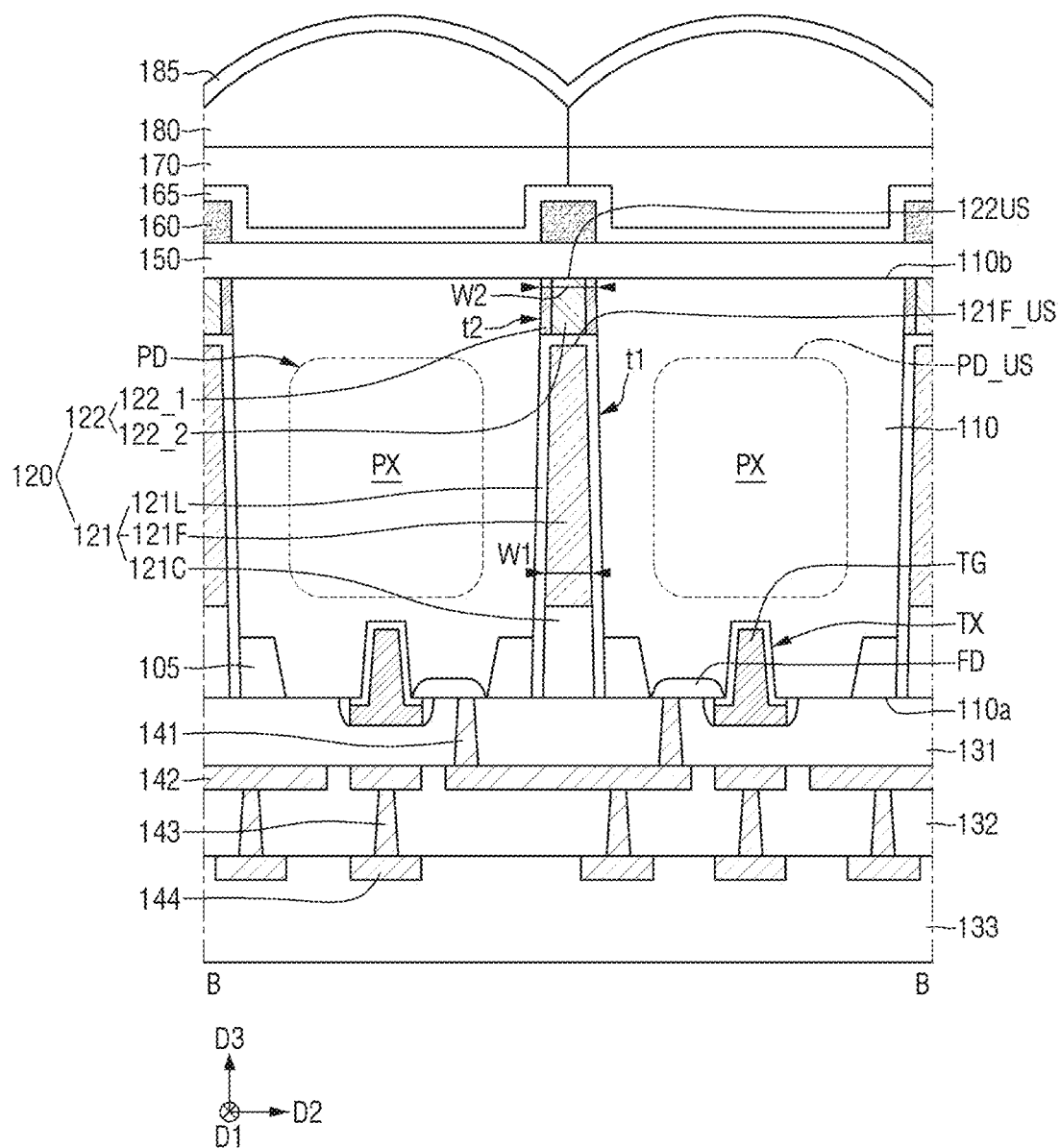
FIG. 15 is an example cross-sectional view of an image sensor according to some embodiments.

FIG. 15 is an example cross-sectional view of an image sensor according to some embodiments. For convenience of description, following descriptions are based on differences thereof from those described using FIG. 6A to FIG. 7.

Referring to FIG. 15, the second conductive layer 122 according to some embodiments may not be a single layer.

The second conductive layer 122 may include, for example, a first portion 122_1 and a second portion 122_2. The first portion 122_1 of the second conductive layer 122 may be disposed on an inner sidewall of the second trench t2. The second portion 122_2 of the second conductive layer 122 may be disposed between opposing portions of the first portion 122_1 of the second conductive layer 122.

In some embodiments, the first portion 122_1 of the second conductive layer 122 may include a conductive material. For example, the first portion 122_1 of the second conductive layer 122 may include titanium nitride (TiN). However, inventive concepts of the present disclosure are not limited thereto. The second portion 122_2 of the second conductive layer 122 may include a conductive material. For example, the second portion 122_2 of the second conductive layer 122 may include polysilicon (poly Si). However, inventive concepts of the present disclosure are not limited thereto.

Figure 16:
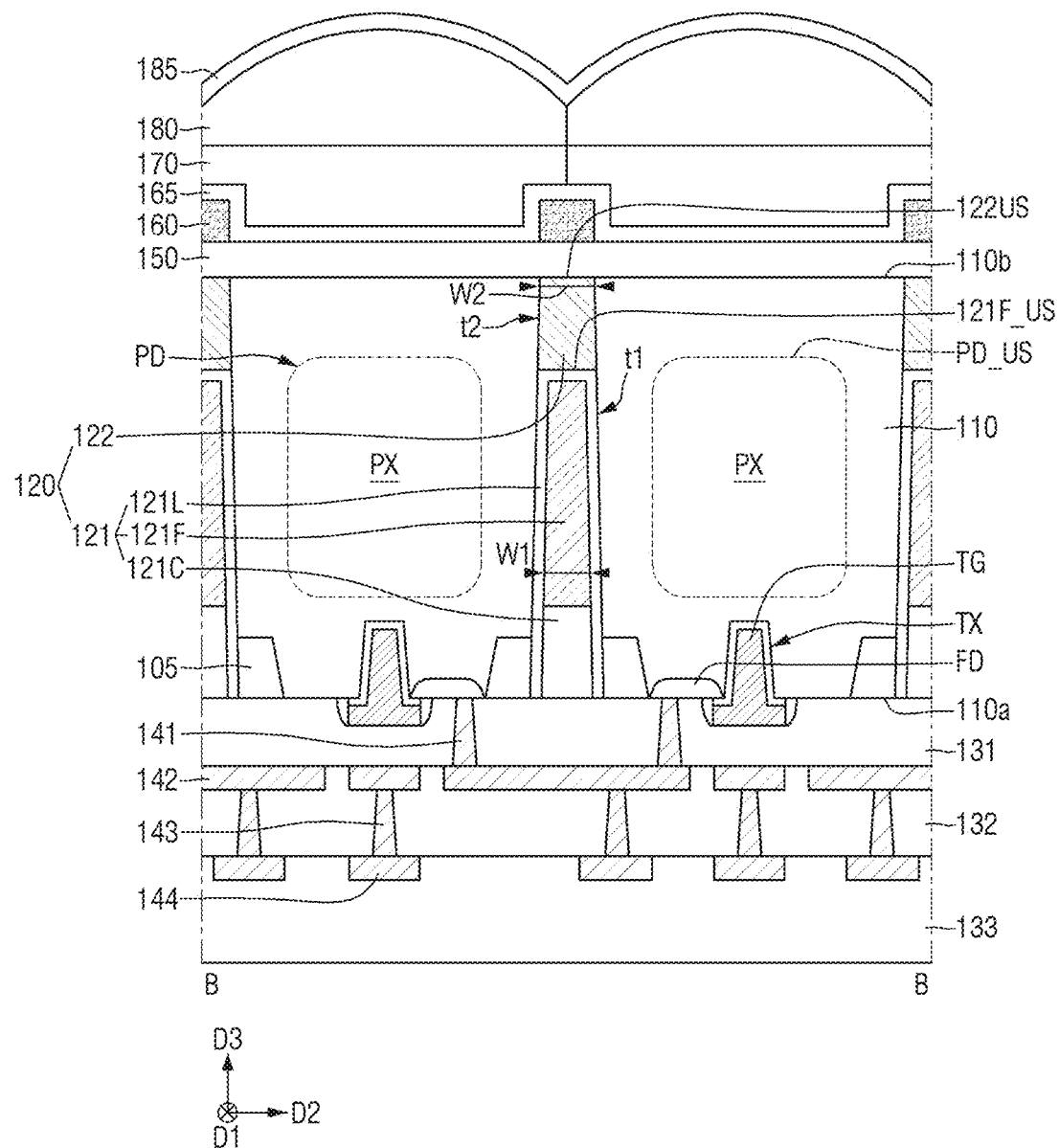
FIG. 16 is an example cross-sectional view of an image sensor according to some embodiments.

FIG. 16 is an example cross-sectional view of an image sensor according to some embodiments. For convenience of description, following descriptions are based on differences thereof from those described using FIG. 6A to FIG. 7.

Referring to FIG. 16, a vertical level of the upper surface 121F_US of the first conductive layer 121F based on the first surface 110a of the first substrate 110 may be lower than that of the upper surface PD_US of the photoelectric conversion layer PD based on the first surface 110a of the first substrate 110. That is, a portion of the first conductive layer 121F may not overlap the photoelectric conversion layer PD in the second direction D2.

Hereinafter, a method for manufacturing an image sensor according to some embodiments will be described with reference to FIG. 17 to FIG. 31.

FIG. 17 to FIG. 24 show structures of intermediate operations for illustrating a method for manufacturing an image sensor according to some embodiments. For reference, the image sensor manufactured with reference to FIG. 17 to FIG. 24 may be, for example, the image sensor of FIG. 7.

Figure 17:
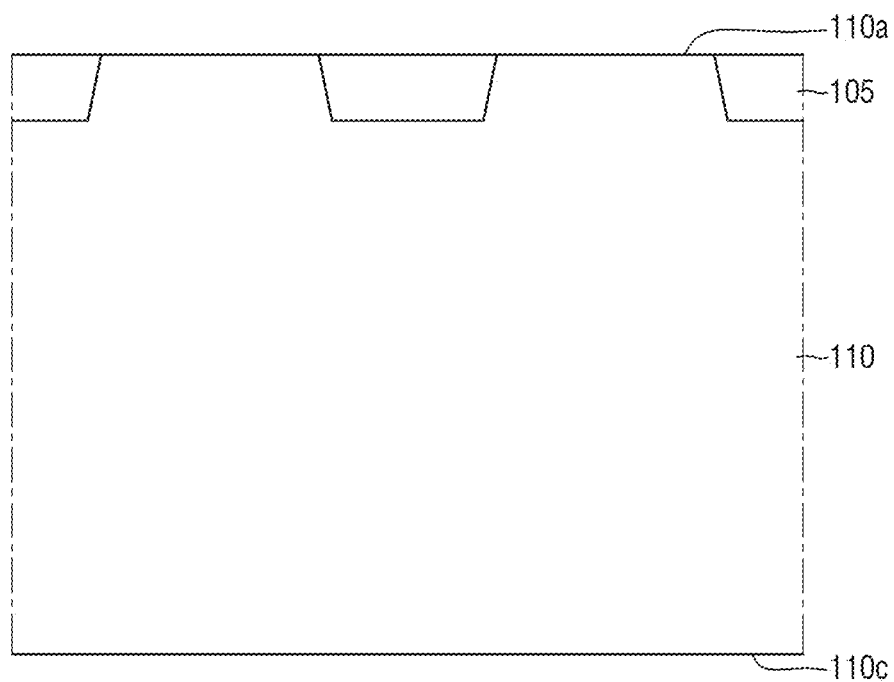
FIGS. 17 to FIG. 24 show structures of intermediate operations for illustrating a method for manufacturing an image sensor according to some embodiments.

Referring to FIG. 17, the first substrate 110 including the first surface 110a and a third face 110c opposite to each other may be provided.

The element isolation pattern 105 may be formed in the first substrate 110. First, a trench may be formed by recessing a portion of the first surface 110a of the first substrate 110. The element isolation pattern 105 may be formed in the trench. The element isolation pattern 105 may define each of the active areas.

Figure 18:
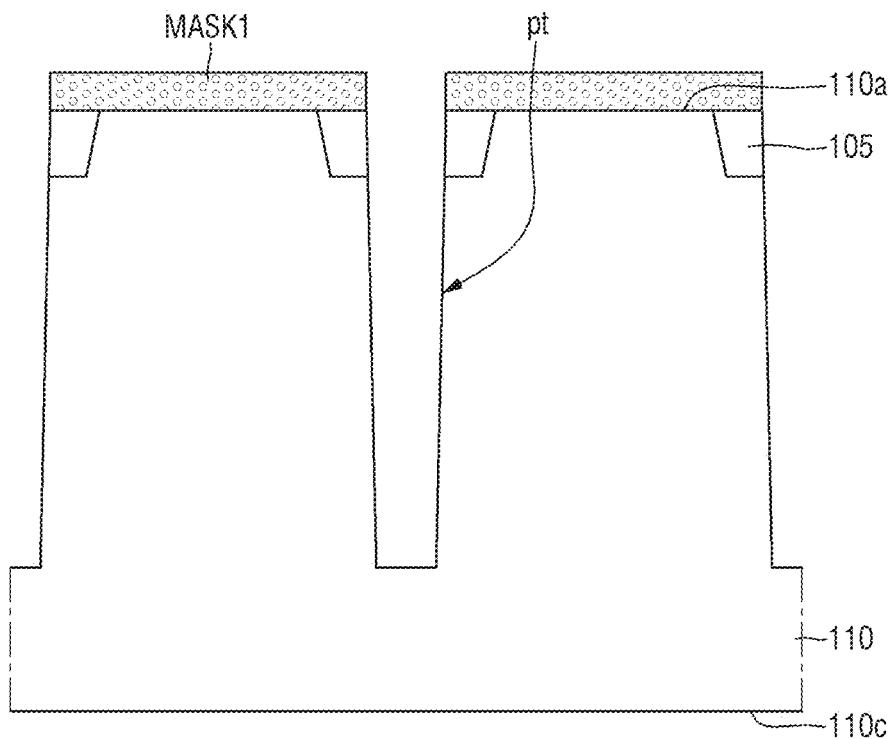

Referring to FIG. 18, a first mask film MASK1 may be formed on the first surface 110a of the first substrate 110. The first mask film MASK1 may have an opening that roughly specifies a location of a pre-trench pt. The first mask film MASK1 may be composed of at least one of a photoresist film, ACL (Amorphous Carbon Layer), SOH (Spin on Hardmask), and SOC (Spin on Carbon) and a silicon nitride film.

Subsequently, the pre-trench pt may be formed using the first mask film MASK1 as an etching mask. The pre-trench pt may extend through the element isolation pattern 105.

Figure 19:
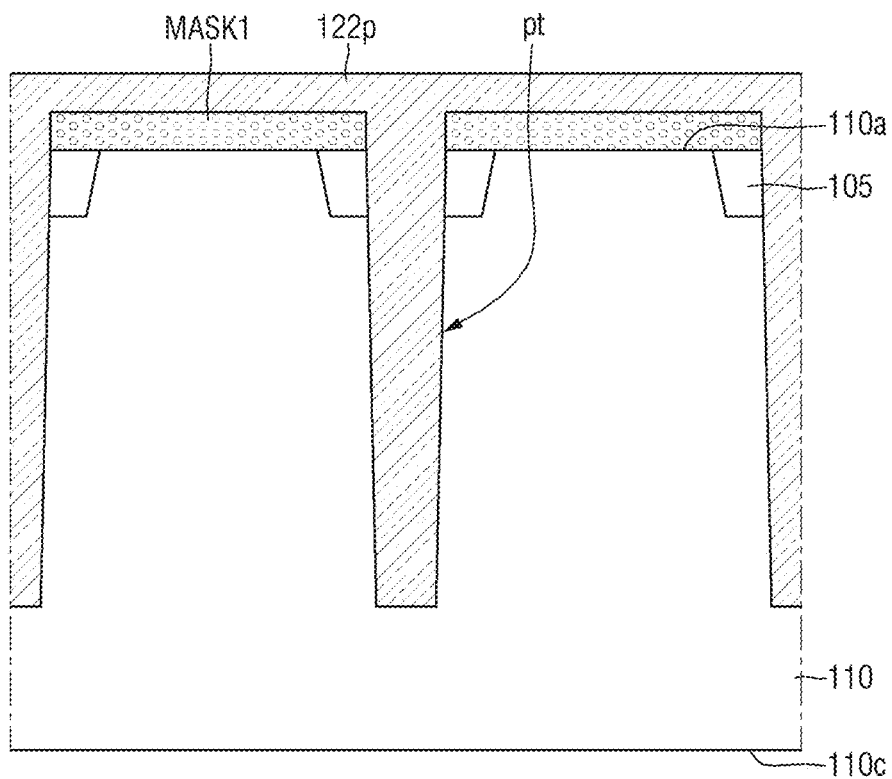

Referring to FIG. 19, a pre-second conductive layer 122p may be formed. The pre-second conductive layer 122p may fill the pre-trench pt. The pre-second conductive layer 122p may cover an entirety of the first mask film MASK1. The pre-second conductive layer 122p may include a conductive material. For example, the pre-second conductive layer 122p may include polysilicon.

Figure 20:
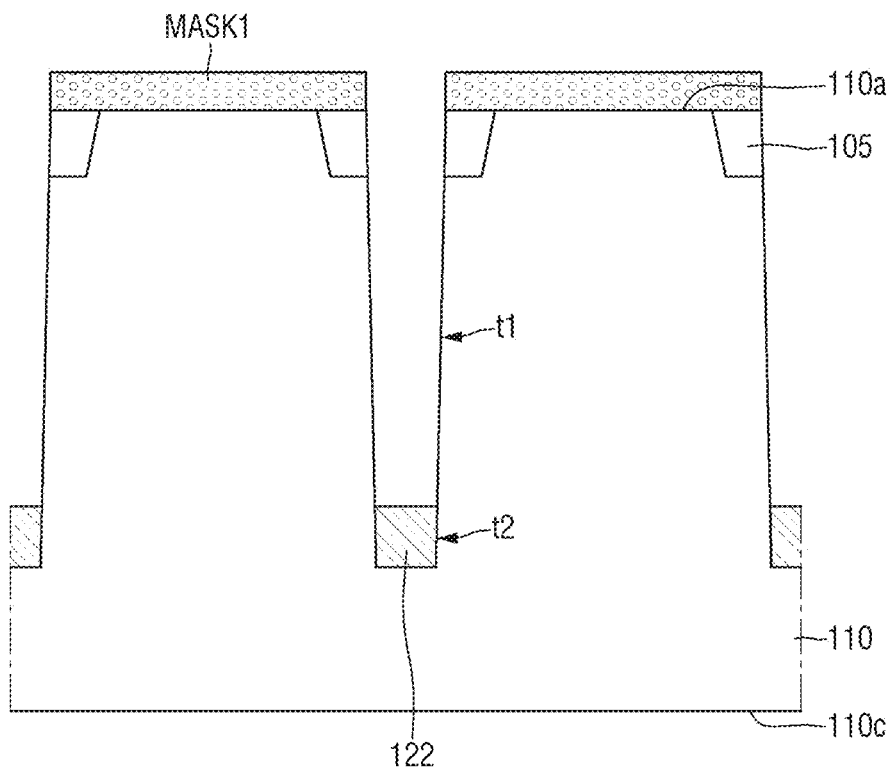

Referring to FIG. 20, the second conductive layer 122 may be formed by etching the pre-second conductive layer 122p. The second conductive layer 122 may refer to the second defining pattern. The first trench t1 and the second trench t2 may be formed by etching the pre-second conductive layer 122p. Specifically, the second conductive layer 122 may be formed through an etch-back process. The second conductive layer 122 may fill the second trench t2. The first trench t1 may expose the second conductive layer 122.

Since the first mask film MASK1 is disposed on the first surface 110a of the first substrate 110, damage to the first substrate 110 may be minimized in a process of forming the second conductive layer 122.

In some embodiments, a material of the pre-second conductive layer 122p may have an etch selectivity relative to a material constituting the first substrate 110. For example, when the pre-second conductive layer 122p is silicon doped with arsenic (As), phosphorus (P), or carbon (C), the pre-second conductive layer 122p may have an etch selectivity relative to the first substrate 110 including silicon. In this case, the second conductive layer 122 may be formed without damaging the first substrate 110.

Figure 21:
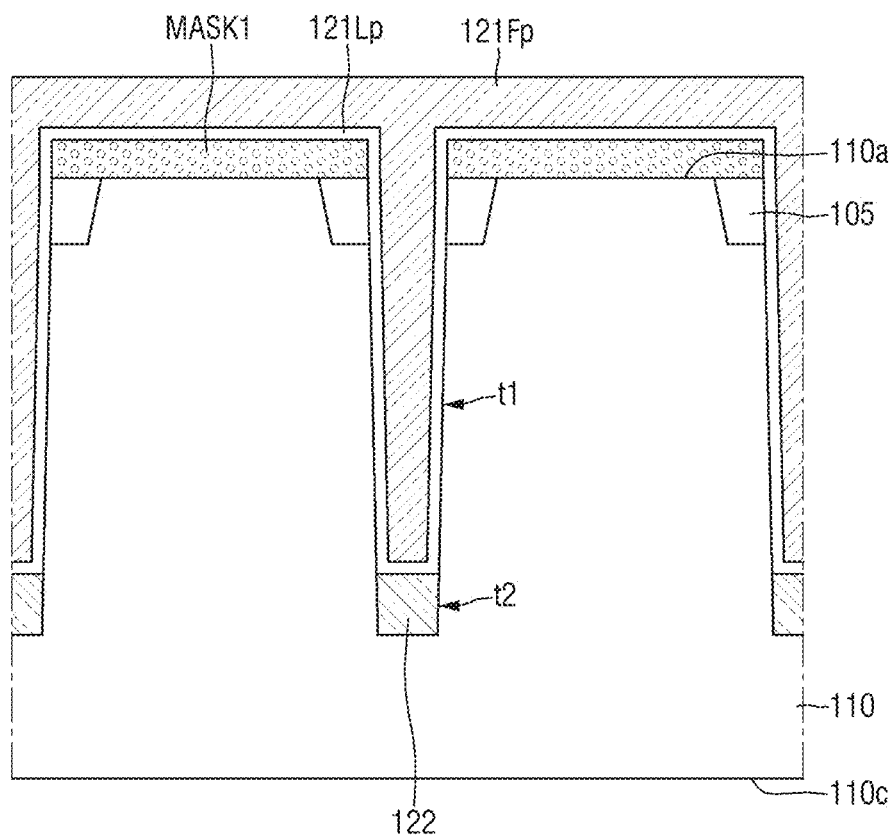

Referring to FIG. 21, a pre-liner film 121Lp may be formed along and on the sidewall and the bottom surface of the first trench t1. In the present disclosure, the bottom surface of the first trench t1 is defined as the face facing the first surface 110a of the first substrate 110. A pre-first conductive layer 121Fp may be formed on the pre-liner film 121Lp.

The pre-liner film 121Lp may extend along and on an upper surface of the first mask film MASK1. The pre-liner film 121Lp may include an insulating material. For example, the pre-liner film 121Lp may include at least one of silicon oxide, aluminum oxide, tantalum oxide, and combinations thereof. However, inventive concepts of the present disclosure are not thereto.

The pre-first conductive layer 121Fp may include a conductive material. For example, the pre-first conductive layer 121Fp may include polysilicon. However, inventive concepts of the present disclosure are not thereto.

Figure 22:
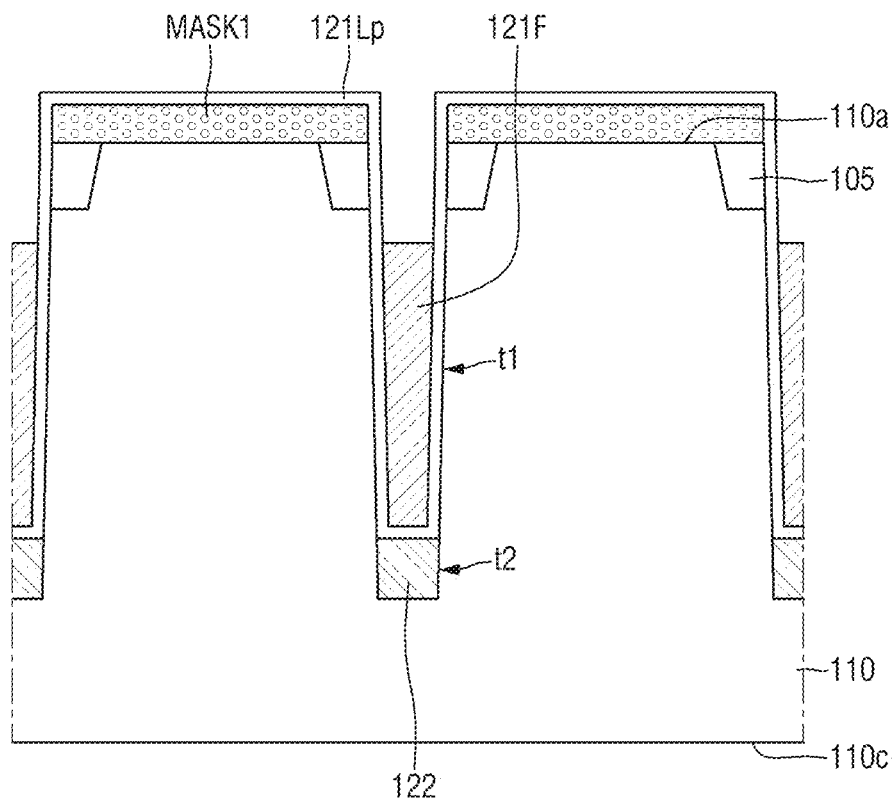

Referring to FIG. 22, the first conductive layer 121F may be formed by etching a portion of the pre-first conductive layer 121Fp. The first conductive layer 121F may be formed through an etch-back process.

Figure 23:
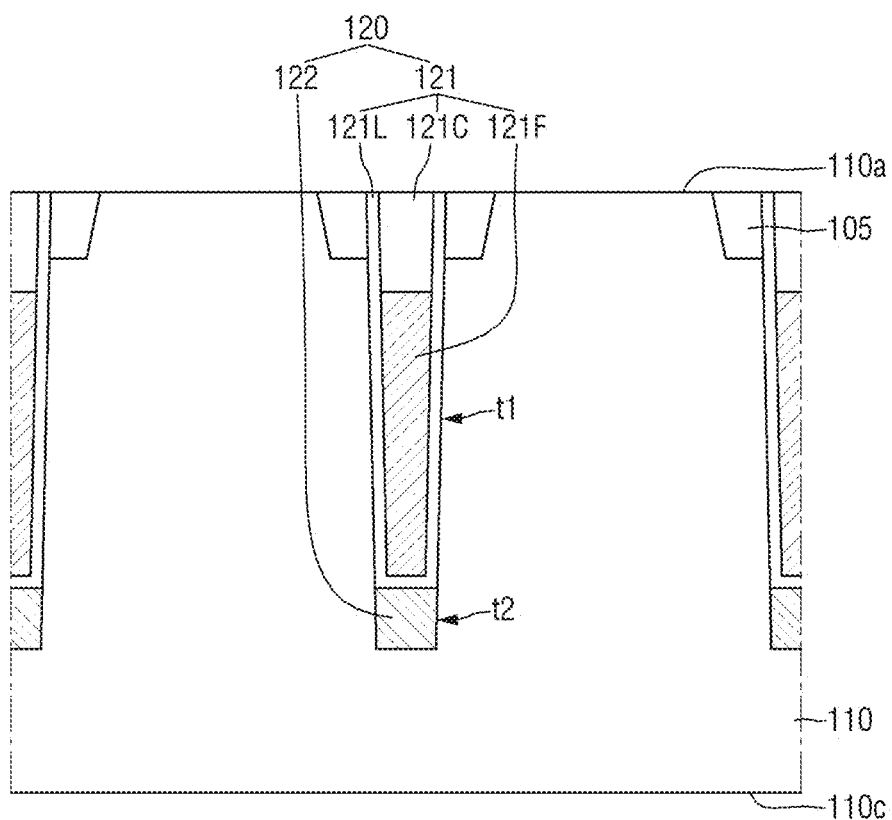

Referring to FIG. 23, the pixel defining pattern 120 may be formed. The pixel defining pattern 120 may include a first defining pattern 121 and a second conductive layer 122.

First, a pre-capping film (not shown) may be formed on the first conductive layer 121F. Then, a portion of the pre-capping film, a portion of the pre-liner film 121Lp, and the first mask film MASK1 may be removed to form the liner film 121L and the capping film 120C. A portion of the pre-capping film, a portion of the pre-liner film 121Lp, and the first mask film MASK1 may be removed such that the first surface 110a of the first substrate 110 may be exposed.

Figure 24:
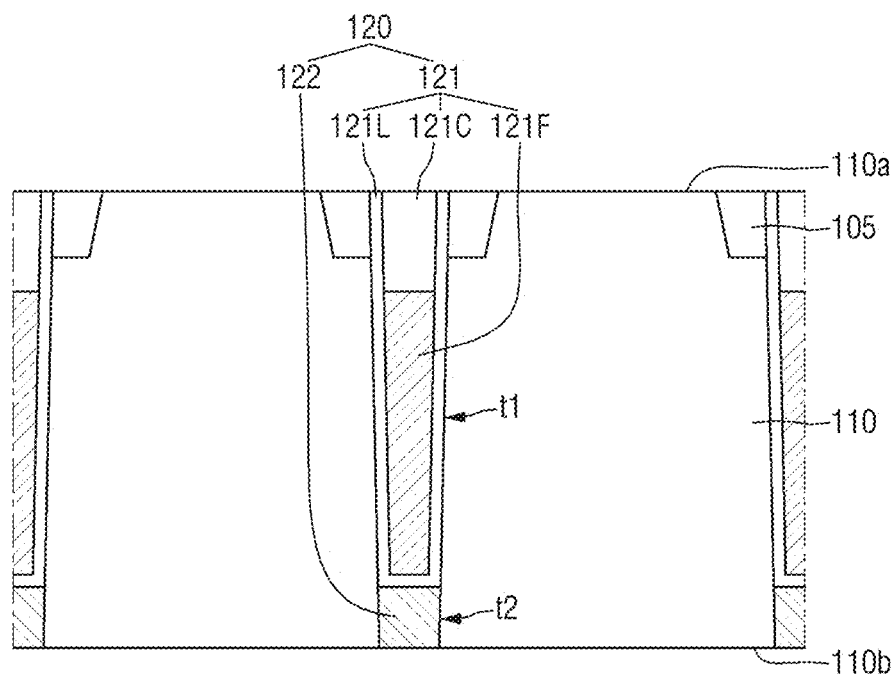

Referring to FIG. 24, the second conductive layer 122 may be exposed by removing a portion of the first substrate 110.

The first substrate 110 may be removed in a starting manner from the third side 110c of the first substrate 110. A portion of the first substrate 110 may be removed to form the second surface 110b. The second surface 110b of the first substrate 110 may expose the second conductive layer 122.

One face of the second conductive layer 122 may be coplanar with the second surface 110b of the first substrate 110.

FIG. 25 to FIG. 31 shows structures of intermediate operations for illustrating a method for manufacturing an image sensor according to some embodiments. For reference, the image sensor manufactured with reference to FIG. 25 to FIG. 31 may be, for example, the image sensor shown in FIG. 12.

Figure 25:
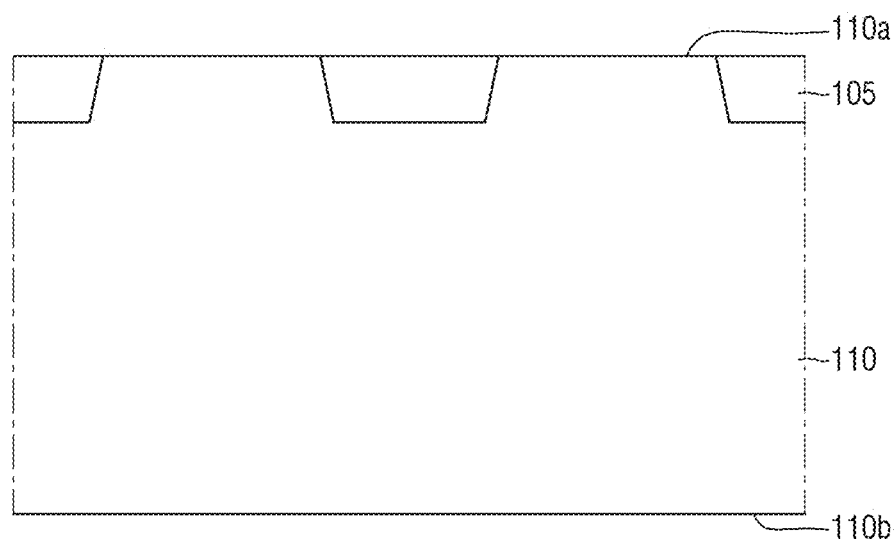
FIGS. 25 to FIG. 31 shows structures of intermediate operations for illustrating a method for manufacturing an image sensor according to some embodiments.

Referring to FIG. 25, the first substrate 110 including the first surface 110a and the second surface 110b opposite to each other may be provided.

The element isolation pattern 105 may be formed in the first substrate 110. First, a trench in which a portion is recessed from the first surface 110a of the first substrate 110 may be formed in the first substrate 110. The element isolation pattern 105 may be formed in the trench. The element isolation pattern 105 may define each of the active areas.

Figure 26:
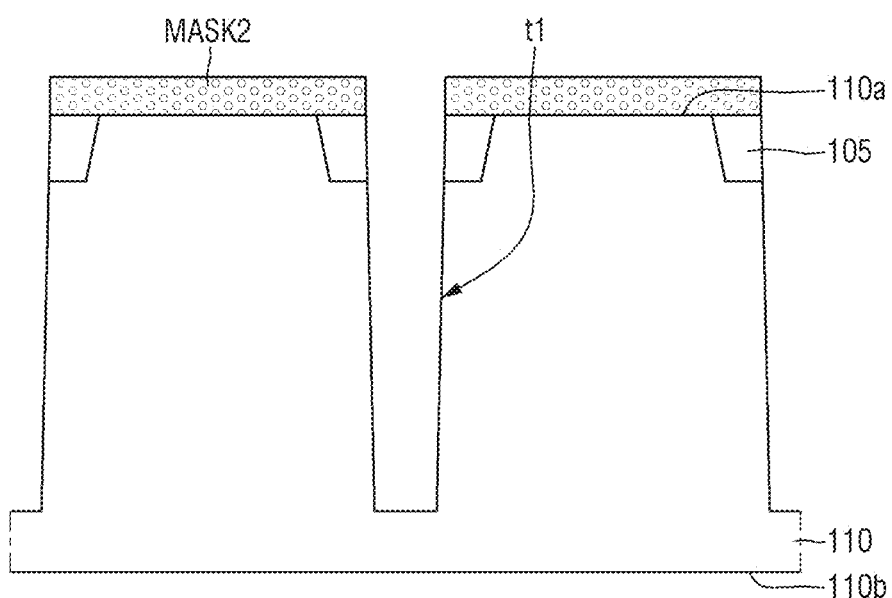

Referring to FIG. 26, a second mask film MASK2 may be formed on the first surface 110a of the first substrate 110. The second mask film MASK2 may have an opening that roughly specifies a location of the first trench t1. The second mask film MASK2 may be composed of at least one of a photoresist film, ACL (Amorphous Carbon Layer), SOH (Spin on Hardmask), SOC (Spin on Carbon) and a silicon nitride film.

Subsequently, the first trench t1 may be formed using the second mask film MASK2 as an etch mask. The first trench t1 may extend through the element isolation pattern 105.

Figure 27:
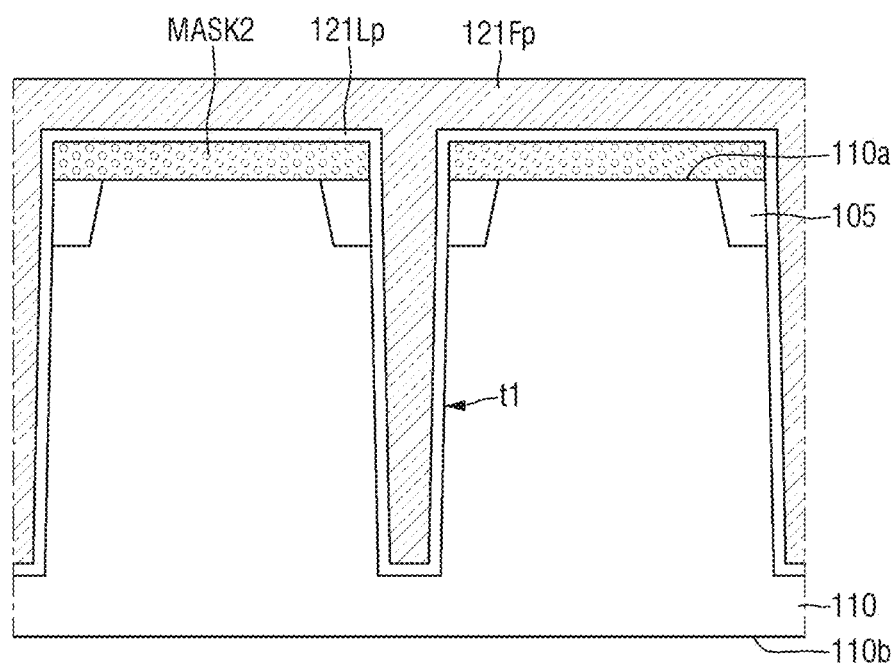

Referring to FIG. 27, the pre-liner film 121Lp may be formed along the sidewall and the bottom surface of the first trench t1. The pre-first conductive layer 121Fp may be formed on the pre-liner film 121Lp.

The pre-liner film 121Lp may extend along and on an upper surface of the second mask film MASK2. The pre-liner film 121Lp may include an insulating material. For example, the pre-liner film 121Lp may include at least one of silicon oxide, aluminum oxide, tantalum oxide, and combinations thereof. However, inventive concepts of the present disclosure are not thereto.

The pre-first conductive layer 121Fp may include a conductive material. For example, the pre-first conductive layer 121Fp may include polysilicon. However, inventive concepts of the present disclosure are not thereto.

Figure 28:
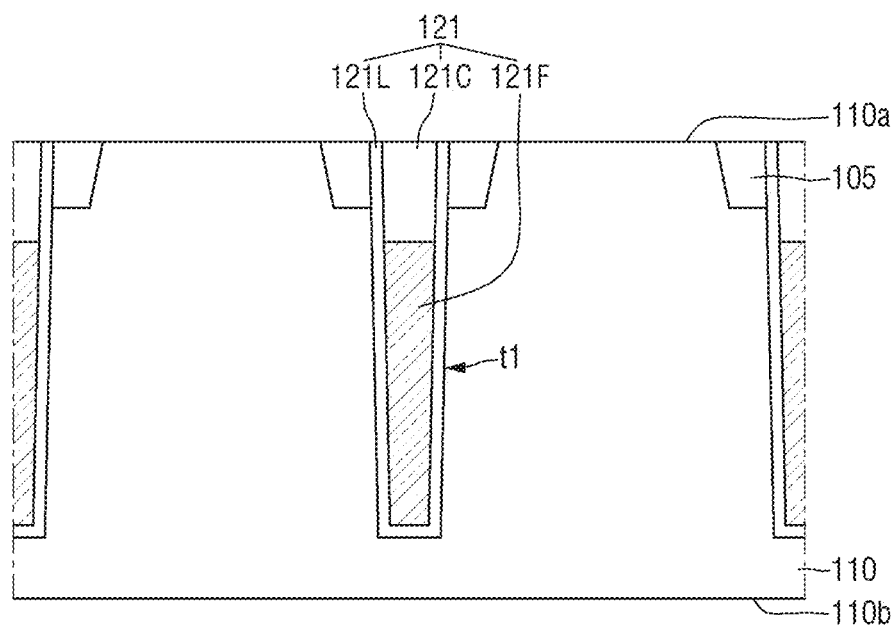

Referring to FIG. 28, the first defining pattern 121 may be formed. The first defining pattern 121 may include the liner film 121L, the first conductive layer 121F, and the capping film 121C.

First, the first conductive layer 121F may be formed by etching a portion of the pre-first conductive layer 121Fp. The first conductive layer 121F may be formed through an etch-back process. Subsequently, the pre-capping film (not shown) may be formed on the first conductive layer 121F. Then, a portion of the pre-capping film, a portion of the pre-liner film 121Lp, and the second mask film MASK2 may be removed to form the liner film 121L and the capping film 120C. A portion of the pre-capping film, a portion of the pre-liner film 121Lp, and the second mask film MASK2 may be removed such that the first surface 110a of the first substrate 110 may be exposed.

Figure 29:
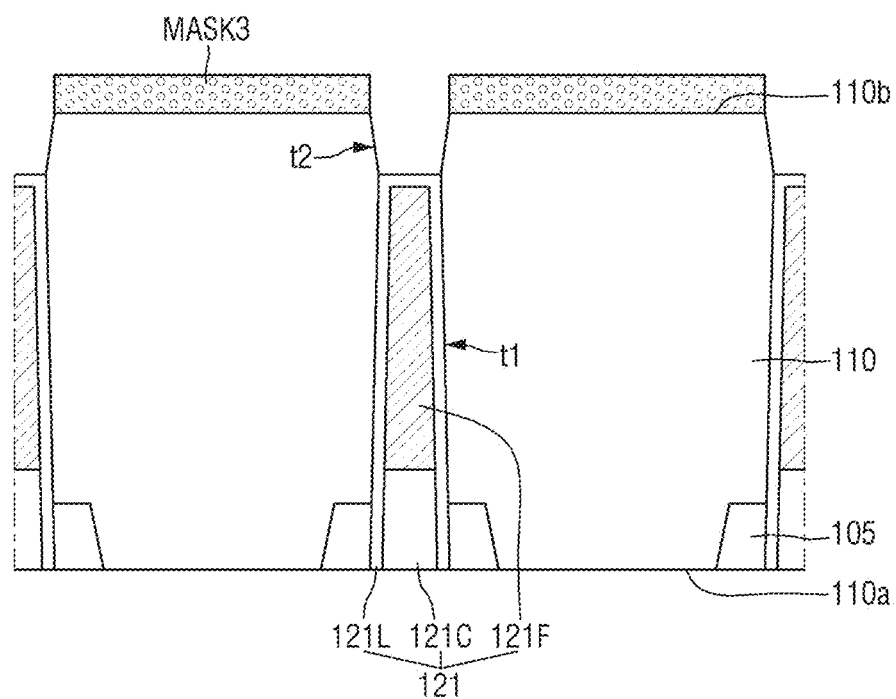

Referring to FIG. 29, a third mask film MASK3 may be formed on the second surface 110b of the first substrate 110. The third mask film MASK3 may have an opening that roughly specifies a location of the second trench t2. The third mask film MASK3 may be composed of at least one of a photoresist film, ACL (Amorphous Carbon Layer), SOH (Spin on Hardmask), SOC (Spin on Carbon) and a silicon nitride film.

Subsequently, the second trench t2 may be formed using the third mask film MASK3 as an etching mask. The second trench t2 may expose the first defining pattern 121.

Figure 30:
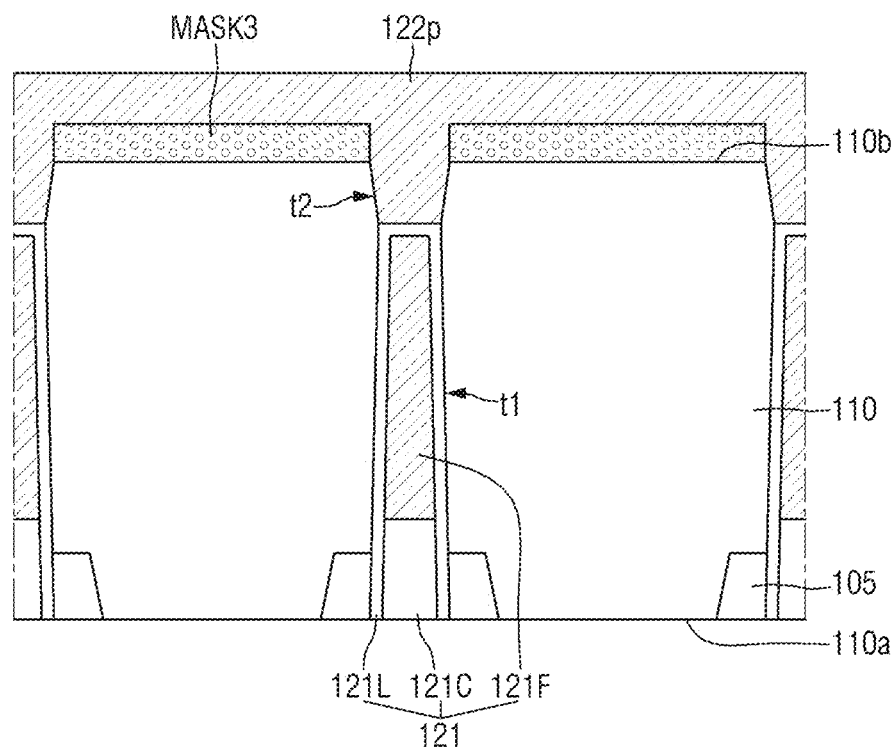

Referring to FIG. 30, the pre-second conductive layer 122p filling the second trench t2 may be formed. The pre-second conductive layer 122p may cover an entirety of the third mask film MASK3. The pre-second conductive layer 122p may include a conductive material. For example, the pre-second conductive layer 122p may include polysilicon. However, inventive concepts of the present disclosure are not thereto.

Figure 31:
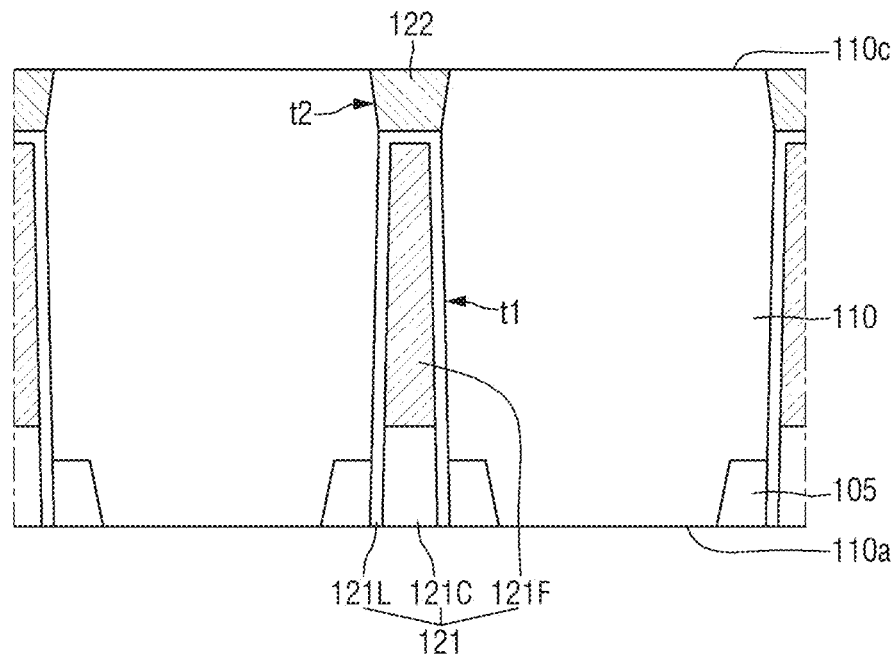

Referring to FIG. 31, the second conductive layer 122 may be formed by removing a portion of the pre-second conductive layer 122p. The second conductive layer 122 may be formed, so that the pixel defining pattern 120 may be formed. The pixel defining pattern 120 may include the first defining pattern 121 and the second defining pattern 122. The second defining pattern 122 may be referred to as the second conductive layer.

Subsequently, the third mask film MASK3 may be removed.

In one or more example embodiments discussed above, power circuitry, for example power circuitry in the first and/or second semiconductor chips 100 and 200 and/or power circuitry in an external power supply (e.g., battery) connected to the first and/or second semiconductor chips 100 and 200, may apply the first voltage to the first conductive layer 121F through the first pad pattern 355, apply the second voltage (e.g., well bias voltage) to the second conductive layer 122 through the second pad pattern 365, and/or apply the second voltage (e.g., well bias voltage, ground voltage) to ground areas GND through ground contacts (e.g., first ground contact CT1).

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In concluding the detailed description, those skilled in the art will appreciate that many variations and modifications may be made to the presented embodiments without substantially departing from the principles of the present disclosure. Therefore, the disclosed presented embodiments of the disclosure are used in a generic and descriptive sense only and not for purposes of limitation.

What is claimed is:

1. An image sensor comprising:
a substrate including a first surface and a second surface opposite each other, the substrate including a plurality of unit pixel regions in the substrate, each of the plurality of unit pixel regions including a photoelectric conversion layer;
a pixel defining pattern extending through the substrate in a first direction, the pixel defining pattern defining each of the plurality of unit pixel regions;
a first pad pattern and a second pad pattern on the second surface of the substrate; and a micro lens on the second surface of the substrate and corresponding to the plurality of unit pixel regions, wherein the pixel defining pattern includes a first conductive layer and a second conductive layer spaced apart from the first conductive layer, wherein the first conductive layer is spaced apart from the first surface, and wherein the first pad pattern is electrically connected to the first conductive layer, the second pad pattern is electrically connected to the second conductive layer, the image sensor includes circuitry, the circuitry of the image sensor is configured to apply a first voltage to the first conductive layer through the first pad pattern, the circuitry of the image sensor is configured to apply a second voltage to the second conductive layer through the second pad pattern, and the first voltage is different from the second voltage.

2. The image sensor of claim 1, wherein the plurality of unit pixel regions include a first pixel region and a second pixel region, the first pixel region does not include a ground area, the second pixel region includes a ground area, and the image sensor is configured to use a signal generated from the second pixel region as information for auto focusing.

3. The image sensor of claim 2, wherein the second pixel region includes a first sub-pixel and a second sub-pixel adjacent to each other, each of the first sub-pixel and the second sub-pixel include the ground area, and the first sub-pixel and the second sub-pixel share the micro lens.

4. The image sensor of claim 1, wherein an upper surface of the second conductive layer is coplanar with the second surface of the substrate.

5. The image sensor of claim 1, wherein a width in a second direction of the first conductive layer is smaller than a width in the second direction of the second conductive layer, and the second direction intersects the first direction.

6. The image sensor of claim 1, wherein the substrate includes a first trench and a second trench, the pixel defining pattern includes a first defining pattern in the first trench and a second conductive layer in the second trench, the first defining pattern includes a liner film and the first conductive layer on the liner film, and the liner film is disposed along and on a sidewall of the first trench and a bottom surface of the first trench.

7. The image sensor of claim 6, wherein the second conductive layer is a single layer.

8. The image sensor of claim 6, wherein the second conductive layer includes a first portion and a second portion, the first portion of the second conductive layer is disposed along and on a sidewall of the second trench, and the second portion of the second conductive layer is surrounded by the first portion of the second conductive layer.

9. The image sensor of claim 6, wherein at a boundary between the first trench and the second trench, a width in a second direction of the first trench is greater than a width in the second direction of the second trench, and the second direction intersects the first direction.

10. An image sensor comprising:

a substrate including a first region, a second region, a first surface, and a second surface opposite the first surface, the substrate including a plurality of unit pixel regions in the substrate, each of the plurality of unit pixel regions including a photoelectric conversion layer;

a pixel defining pattern extending through the substrate in a first direction, the pixel defining pattern defining each of the plurality of unit pixel regions, the pixel defining pattern including a first defining pattern and a second conductive layer aligned with each other in the first direction such that the first defining pattern and the second conductive layer vertically overlap each other;

a micro lens on the second surface of the substrate in the first region of the substrate, the micro lens corresponding to the plurality of unit pixel regions;

a first pad pattern on the second surface of the substrate in the second region of the substrate, the first pad pattern being electrically connected to the first defining pattern; and a second pad pattern on the second surface of the substrate in the second region of the substrate, the second pad pattern being electrically connected to the second conductive layer, wherein the second conductive layer is in contact with the substrate, the image sensor includes circuitry, the circuitry of the image sensor is configured to apply a first voltage to the first defining pattern through the first pad pattern, the circuitry of the image sensor is configured to apply a second voltage to the second conductive layer through the second pad pattern, and the second voltage is different from the first voltage.

11. The image sensor of claim 10, wherein the first defining pattern includes a first conductive layer connected to the first pad pattern, the second conductive layer is electrically insulated from the first conductive layer and connected to the second pad pattern, and an uppermost surface of the first conductive layer is spaced apart from a lowermost surface of the second conductive layer in the first direction.

12. The image sensor of claim 10, further comprising:

a contact on the first surface of the substrate, wherein the image sensor includes circuitry, the second region of the substrate includes a dummy unit pixel region, the dummy unit pixel region includes a ground area and is free of the photoelectric conversion layer, the contact is connected to the ground area, the circuitry of the image sensor is configured to apply a well bias voltage to the ground area through the contact.

13. The image sensor of claim 10, wherein a vertical level of a bottom surface of the first pad pattern based on the first surface of the substrate is lower than a vertical level of a bottom surface of the second pad pattern based on the first surface of the substrate.

14. The image sensor of claim 10, wherein the plurality of unit pixel regions in the first region include a first pixel region and a second pixel region, the first pixel region does not include a ground area, the second pixel region includes the ground area, and the image sensor is configured to use a signal generated from the second pixel region as information for auto focusing.

15. An image sensor comprising:
a substrate including a first region, a second region, a first surface, a second surface opposite the first surface, a first trench, and a second trench,
the substrate including a plurality of unit pixel regions in the substrate, each of the plurality of unit pixel regions including a photoelectric conversion layer,
the second region of the substrate including a dummy unit pixel region in the substrate,
the dummy unit pixel region including a ground area and being free of the photoelectric conversion layer;
a pixel defining pattern extending through the substrate, the pixel defining pattern defining each of the plurality of unit pixel regions and the dummy unit pixel region,
the pixel defining pattern including a first defining pattern in the first trench and a second conductive layer in the second trench,
the first defining pattern includes a liner film and a first conductive layer on the liner film,
the liner film being disposed along and on a sidewall of the first trench and a bottom surface of the first trench;
a micro lens on the second surface of the substrate in the first region of the substrate, the micro lens corresponding to the plurality of unit pixel regions;
a first pad pattern on the second surface of the substrate in the second region of the substrate, the first pad pattern being electrically connected to the first conductive layer; and
a second pad pattern on the second surface of the substrate in the second region of the substrate, the second pad pattern being electrically connected to the second conductive layer, wherein
the image sensor includes circuitry,
the circuitry of the image sensor is configured to apply a first voltage to the first conductive layer through the first pad pattern,
the circuitry of the image sensor is configured to apply a second voltage to the second conductive layer through the second pad pattern, and
the circuitry of the image sensor is configured to apply the second voltage to the ground area of the dummy unit pixel region.

16. The image sensor of claim 15, wherein the first voltage is a negative voltage and the second voltage is a well bias voltage.

17. The image sensor of claim 15, wherein
the plurality of unit pixel regions in the first region include a first pixel region and a second pixel region,
the first pixel region is free of a ground area,
the second pixel region includes the ground area, and
the image sensor is configured to use a signal generated from the second pixel region as information for auto focusing.

18. The image sensor of claim 17, wherein
the second pixel region includes a first sub-pixel and a second sub-pixel adjacent to each other,
each of the first sub-pixel and the second sub-pixel include the ground area, and
the first sub-pixel and the second sub-pixel share the micro lens with each other.

* * * * *